United States Patent [19]

Daubenbüchel et al.

[11] Patent Number: 5,141,698
[45] Date of Patent: * Aug. 25, 1992

[54] EXTRUSION BLOW MOLDING OF MULTILAYER HOLLOW BODIES WITH LAYER DISTURBANCES LIMITED TO FLASH

[75] Inventors: Werner Daubenbüchel, Bergisch-Gladbach; Otto Eiselen, Königswinter; Karsten Friedrichs, Bad Honnerf; Erich Kiefer; Peter Klüsener, both of Bonn, all of Fed. Rep. of Germany

[73] Assignee: Krupp Kautex Maschinenbau GmbH, Bonn, Fed. Rep. of Germany

[*] Notice: The portion of the term of this patent subsequent to Sep. 1, 2009 has been disclaimed.

[21] Appl. No.: 670,503

[22] Filed: Mar. 15, 1991

Related U.S. Application Data

[63] Continuation of Ser. No. 409,497, Sep. 19, 1989, abandoned.

[30] Foreign Application Priority Data

Sep. 20, 1988 [DE] Fed. Rep. of Germany ....... 3831837

[51] Int. Cl.$^5$ ................. B29C 49/04; B29C 49/22; B29C 49/78
[52] U.S. Cl. .................... 264/515; 425/132; 425/133.1; 425/523
[58] Field of Search ............. 264/515; 425/132, 133.1, 425/523

[56] References Cited

U.S. PATENT DOCUMENTS

| | | | |
|---|---|---|---|
| 3,457,337 | 7/1969 | Turner | 264/98 |
| 3,611,494 | 3/1969 | Feuerherm | 425/376.1 |
| 3,706,827 | 12/1972 | Nott et al. | 264/176 |
| 3,985,490 | 10/1976 | Kader | 425/381 |
| 4,120,633 | 10/1978 | Feuerherm | 425/462 |
| 4,149,839 | 4/1979 | Iwawaki et al. | 425/133.1 |
| 4,208,178 | 6/1980 | Przytulla | 425/462 |
| 4,422,838 | 12/1983 | Iwawaki et al. | 425/376 A |
| 4,548,569 | 10/1985 | Pitigliano et al. | 425/133.1 |
| 4,717,326 | 1/1988 | Montonaga et al. | 425/133.1 |
| 4,758,144 | 7/1988 | Becker | 425/133.1 |
| 4,867,664 | 9/1989 | Fukuhara | 425/132 |
| 4,874,305 | 10/1989 | McGill et al. | 425/131.1 |
| 4,937,035 | 6/1990 | Richter | 264/515 |
| 4,978,290 | 12/1990 | Fukuhara | 425/147 |
| 5,004,578 | 4/1991 | Eiselen | 264/514 |

FOREIGN PATENT DOCUMENTS

| | | |
|---|---|---|
| 0249866 | 6/1987 | European Pat. Off. |
| 2050563 | 4/1972 | Fed. Rep. of Germany |
| 2161356 | 6/1973 | Fed. Rep. of Germany |
| 2712910 | 9/1978 | Fed. Rep. of Germany |
| 3026822 | 1/1982 | Fed. Rep. of Germany |
| 3439285 | 8/1985 | Fed. Rep. of Germany |
| 3623308 | 1/1988 | Fed. Rep. of Germany |
| 2299957 | 9/1976 | France |
| 2354188 | 1/1978 | France |
| 55-039448 | 11/1980 | Japan ................. 264/173 |
| 56-033928 | 4/1981 | Japan |
| 60-187513 | 2/1986 | Japan |
| 61-158409 | 7/1986 | Japan ................. 264/515 |
| 61-171320 | 8/1986 | Japan |

Primary Examiner—Jan H. Silbaugh
Assistant Examiner—Catherine Timm
Attorney, Agent, or Firm—Panitch Schwarze Jacobs & Nadel

[57] ABSTRACT

In a process and apparatus for the production of hollow bodies from thermoplastic material, having a wall of a laminate formed by at least first and second layers, by means of extrusion blow molding, a preform having a wall structure with a suitable number of layers is first produced in a batch-wise procedure using an extrusion head. The material required to produce the preform is guided in the extrusion head in such a way that disturbed portions of the laminate pass into the waste flash portions at the ends of the hollow body produced from the preform, so that the wall of the finished hollow body is devoid of disturbed laminate portions of that kind.

27 Claims, 12 Drawing Sheets

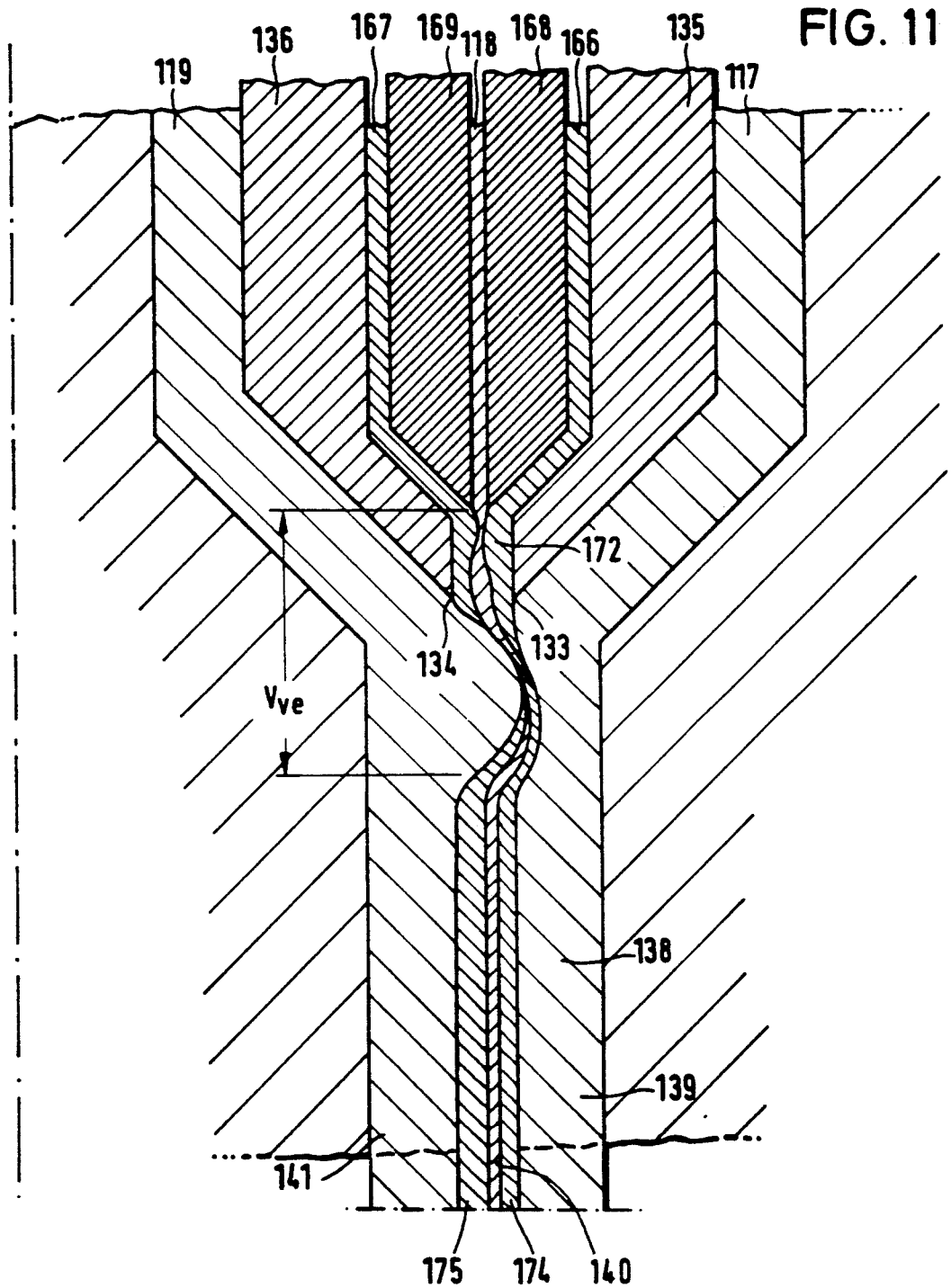

EXTRUSION BLOW MOLDING OF MULTILAYER HOLLOW BODIES WITH LAYER DISTURBANCES LIMITED TO FLASH

This application is a continuation of U.S. patent application Ser. No. 409,497 filed Sep. 19, 1989, now abandoned.

BACKGROUND OF THE INVENTION

The present invention relates generally to a process and an apparatus for the production of hollow bodies from thermoplastic material, the wall of which comprises at least first and second layers, by means of extrusion blow molding.

In a process for the production of a hollow body from thermoplastic material with a wall in the form of a laminate structure comprising at least first and second layers, preforms which have a suitable number of layers are first produced in a batch-wise manner, using an extrusion unit comprising at least first and second extruders and a common extrusion head and which is provided with storage chambers for storage of the materials which are plasticised in the extruders, together with means for emptying of the storage chambers to form preforms, and flows of material, the number of which corresponds to the number of layers constituting the wall of the hollow body are brought together in the extrusion head in such a way that successively adjoining flows of material are joined together in a laminate-forming area to provide a laminate for constituting the wall of the preform, which is advanced from the above-mentioned laminate-forming area through a communicating duct within the extrusion head, to an outlet opening which is disposed at a spacing from the laminate-forming area. A given portion by volume of the laminate is then ejected through the outlet opening to form the preform which has two end portions and a central portion of which at least a part is expanded within the mold cavity of a divided extrusion blowing mold, under the effect of an increased internal pressure within the preform, while the end portions of the preform are squeezed off the preform, as constituting excess material, by means of a squeezing-off operation in which parts of the extrusion blowing mold are involved, with the excess material remaining outside the mold cavity of the mold.

German laid-open application (DE-OS) No 26 04 247 discloses a procedure in which the individual flows of material are firstly put into a configuration which is annular in cross-section, within the extrusion head, and the flows of material are then formed into the laminate which constitutes the preform, before the laminate leaves the extrusion head through the outlet opening. The laminate structure is formed during the operation of explusion of the stored materials to form the perform, the materials being expelled in that way by means of pistions. It is advantageous for the flows of material of all the layers to be brought together in a region which is very short as measured in the axial direction of the injection head. It is also possible for all the flows of material to be brought together to form the laminate structure, in a plane which is substantially normal to the longitudinal axis of the extrusion head.

The fact that the preform is formed in a batch-wise manner means that a distinction can be made between two operating phases within the extrusion head. After conclusion of the production of a preform by the ejection of a suitable amount of material through the outlet opening of the extrusion head, the above-mentioned storage chambers are emptied. In the subsequent phase of operation of the apparatus, each of the storage chambers is filled with material which is conveyed into the respectively appropriate storage chamber by a respectively associated plasticising unit, for example screw presses. In that sitution the pistons which are used for emptying of the storage chambers are moved back into their respective starting positions. During that phase of operation of the equipment, no preform is ejected from the extrusion head so that the material which is to be found in the duct system between the storage chambers and the outlet opening is not moved. After the operation of filling the storage chambers with the respective materials has been concluded, there then follows the second phase of operation in which the materials are ejected from the storage chambers under the effect of the pistons and are displaced towards the outlet opening. At the same time, the laminate structure is formed in the region in which the ducts carrying the flows of individual materials meet. From the laminate-formation area, the material then flows in the form of a laminate structure through a communicating duct towards the outlet opening. During that second phase of operation, the ejection procedure which provides for forming the preform is quite predominantly effected by the material being displaced out of the respectively storage chambers by the associated pistons. In addition that procedure involves the use of a smaller amount of material which, with the plasticising units operating continuously, is moved thereby towards the outlet opening during the ejection process.

The discontinuous production of performs results in different operating conditions, corresponding to the different phases of operation, in particular in regard to the pressure condtions obtaining in the extrusion head. Those different and accordingly varying pressure conditions mean that, at the beginning and/or at the end of each ejection operation, the pressure conditions obtaining in the laminate-formation region in the individual flows of material which go to make up the laminate structure differ, and that accordingly results in irregularities in the formation of the laminate structure. That is to be attributed for example to the fact that the volumes of the individual layers of the structure and therewith also the volumes of the individual storage chambers are normally different. As thermoplastic materials, in the plastic condition, do not behave like a liquid but within certain limits have a certain degree of resilient compressibility which, when the pressure is relieved, results in a return movement, that is to say an increase in the volume of the plastic material, it will be noted that, at the beginning and the end of each ejection stage, the laminate experiences undesirable deformation in the area of the apparatus in which the laminate structure is formed, due to differences in compression and compression-release effects occurring in the individual flows of material which go to make up the laminate. Such deformation of the laminate structure will result in irregularities in the laminate, in particular in regard to the spatial and quantitative distribution of the individual layers of the laminate structure. Those irregularities will occur in the first phase of the ejection operation as a condition of equilibrium will be restored, shortly after the beginning of the ejection operation. A similar aspect may also apply in regard to the terminal phase of the ejection operation. After the conclusion of the movement of the pistons which produce the ejection effect, the material experiences a relief of pressure and a decompression effect which will vary in relation to the individual layers of material and in the flows of material which make up the layers, by virtue of the differences in volume thereof, so that in this respect also irregularities in the distribution of the individual layers in the laminate structure may occur, in particular in the region of the part of the arrangement in which the laminate structure is formed, by virtue of the different pressure conditions obtaining therein. Those irregularities do not occur when preforms are extruded continuously as such a procedure does not give rise to variations in the pressure conditions, which are caused by batch-wise extrusion, with the attendant absence of laminate structure irregularities.

The above-mentioned irregularities which inevitably occur in batch-wise extrusion procedures can result in serious reductions in the level of quality of the articles to be produced from the preforms, by virtue of the fact that the walls thereof are of an irregular nature and configuration. In that connection the way in which the flows of material are guided in the extrusion head prior to the operation of forming the laminate structure is immaterial as the variations in the pressure conditions, which give rise to such irregularities, occur at any event due to the change between filling and emptying, which is typical in respect of batch-wise extrusion.

SUMMARY OF THE INVENTION

An object of the present invention is to provide a process for producing hollow bodies from thermoplastic material by extrusion blow molding, which does not seriously suffer from disadvantages of the above-discussed process.

Another object of the invention is to provide a process for producing hollow bodies from thermoplastic material by extrusion blow molding, in such a way that the quality of hollow bodies produced from preforms is not adversely affected to a seriously considerable degree.

Still another object of the present invention is to provide a process for the production of a hollow body by extrusion blow molding, which is such that it is capable of producing hollow bodies in large numbers using simple means, without irregularities such as to have an adverse effect on the quality of the end product.

Yet another object of the invention is to provide an apparatus for the production of hollow bodies by extrusion blow molding, which is capable of producing preforms for the hollow bodies, which are at least substantially free from irregularities which may occur in the laminate structure of the preform and have an adverse effect on the quality of the end product.

In accordance with the present invention those and other objects are attained by a process for the production of hollow bodies from thermoplastic material, the wall of which comprises at least first and second layers, by means of extrusion blow molding, wherein preforms which comprise a suitable number of layers are produced in a batch-wise manner by means of an extrusion unit comprising at least first and second extruders and a common extrusion head, the extrusion head being provided with storage chambers for storage of the materials which are plasticised in the extruder, and with means for emptying the storage chambers to form preforms. Flows of material, the number of which corresponds to the number of layers in the wall of the hollow body, are brought together in a region in the extrusion head in such a way that mutually adjacent flows are joined together in a laminate-formation region to form a laminate structure for providing the wall of the preform. The laminate structure is advanced through a communicating duct within the extrusion head to the outlet opening which is at a spacing from the above-mentioned laminate-formation region. A portion by volume of the laminate is ejected from the outlet opening to form the preform. The preform produced in that way has first and second end portions and a central portion, at least a part of the central portion being expanded within the cavity of a split blowing mold under the effect of an increased internal pressure, while the end portions of the preform are squeezed off the body of the preform, as constituting excess material, by a squeezing-off operation in which parts of the blowing mold are involved, the excess material remaining outside the mold cavity. The communicating duct between the laminate-formation region and the outlet opening of the extrusion head is such that, with a predetermined volume in respect of the overall portion of material which constitutes a preform to produce a hollow body, the material from which the hollow body is produced, after formation of the laminate, still remains in the extrusion head for a period corresponding to the duration of at least one working cycle, and a portion of disturbed laminate which occurs at the end and/or at the beginning of the operation of forming said overall portion of material, adjacent said laminate-formation region, is in at least one of the end portions of the preform which are squeezed off said overall portion which constitutes the extruded preform, and remain outside the mold cavity of the blowing mold when at least a part of the middle portion of the preform is expanded in the mold cavity.

As will be seen in greater detail hereinafter, the above-outlined process in accordance with the invention has the particular advantage that there is no need for additional expenditure in respect of plastic material in order to achieve the desired effect. When using an extrusion blowing process, it is necessary in any case to employ a preform which is longer than the hollow body to be produced therefrom. The excess material is generally squeezed off the preform when the split blowing mold is closed around the preform, by means of the blowing mold which is provided with squeezing-off edges for that particular purpose and/or by virtue of co-operation between the blowing mold and a blowing mandrel member, so that both ends of the hollow body carry portions of waste or excess material, forming what is often referred to as 'flash', which generally remain connected to the hollow body by way of a thin web portion which can be severed to remove the flash or excess material. The flash portions at the ends of the hollow body are of a certain minimum length, due to the operating procedures involved in carrying out the process, so that the region of the preform which suffers from the irregularities caused by the production procedures can be caused to occur in at least one of the flash portions, even when the region in which the irregularities occur is of a certain axial extent and is therefore not just limited to a very short part of the structure.

The procedure involved is desirably such that the volume of the communicating duct in the extrusion head between the laminate-formation region and the outlet opening:

a) is not less than the sum of the volume made up of the volume of the central portion of the preform and the volume of the end portion which leads in the direction of flow of the material and which is squeezed off in any case, and the volume of the portion of disturbed laminate which occurs at the end of the ejection stroke movement, and b) is not greater than the sum of the volume of the overall portion which forms a preform, and the volume of the end portion of the preform which trails in the direction of flow of the material and which is squeezed off in any case, less the volume of the portion of disturbed laminate which occurs at the beginning of the ejection stroke movement, wherein c) the sum of the volumes of the two portions of disturbed laminate in the overall portion which constitutes the preform is not greater than the sum of the volumes of the two end portions of the preform, which are to be squeezed off as flash.

In that connection, the procedure can be such that the volume of the communicating passage between the laminate-formation region which is most closely adjacent to the outlet opening of the extrusion head, and the outlet opening itself, is such that it is equal to the volume of a preform. It is also possible for the volume of the communicating duct between the laminate-formation region and the outlet opening of the head to be such that it complies with the conditions set forth above in paragraphs a), b) and c), plus an integral multiple of the volume for a preform. An operating procedure which has been found to be particularly advantageous is one in which the overall portion of disturbed laminate, which is made up of the respective end portions of disturbed laminate, is distributed between two adjacent end portions of two successively ejected preforms so that the one portion of disturbed laminate occurs in the end portion at one end of a preform and the second portion of disturbed laminate occurs in the end portion at the correspondingly other end of the preform produced in a following working cycle. However it is also possible to adopt a mode of operation in which the total portion of disturbed laminate occurs only in one end portion of the respective preform.

In another aspect of the invention, there is provided an apparatus for producing hollow bodies from thermoplastic material, the wall of which is in the form of a laminate comprising at least first and second layers, by extrusion blow molding, comprising an extrusion unit having at least first and second extruders and a common extrusion head with an annular outlet opening, and with storage chambers for storage of the materials which are plasticised in the extruders, and means for ejection of the stored materials from the storage chambers to form preforms. The apparatus further comprises at least one divided or split hollow mold provided with squeezing-off edges and providing at least one mold cavity, within which at least a part of the central portion by volume of the preform is expanded under an increased internal pressure to provide the respective hollow body and an end portion by volume of the preform is squeezed off, at at least one end of the central portion of the preform. Provided within the extrusion head is at least one laminate-formation region in which the flows of material for constituting the individual layers of the wall structure are joined together to form the laminate, with the laminate-formation region being connected to the outlet opening by way of a communicating duct through which the laminate flows towards the outlet opening. The volume of the communicating duct between the laminate-formation region and the outlet opening is so selected that disturbed regions which occur in the laminate structure at the beginning and/or at the end of the emptying stroke movement for emptying the storage chambers of the materials contained therein, occur in at least one of the end portions of the preform, which are to be squeezed off as flash.

It has been found to be particularly advantageous, in accordance with a preferred feature of the invention, for the volume of the communicating duct between the laminate-formation region and the outlet opening to be so selected as to satisfy the following conditions:

$Vk \geq x \cdot Vp - Vb + Vve$ and
$Vk \leq x \cdot Vp + Vc - Vvs$,
wherein $x = 1$ or an integral multiple of 1, Vp represents the overall portion by volume which constitutes a respective preform, Vb represents the end portion of a preform, which is to be squeezed off and which is the trailing end in the direction of flow of the laminate structure, Vc represents the end portion of a preform, which is to be squeezed off, being the leading end in the direction of flow of the laminate, Vve is the portion of disturbed laminate, which is the trailing portion as considered in the direction of flow of the laminate, Vvs is the portion of disturbed laminate, which is the leading portion as considered in the direction of flow of the laminate, with the additional condition that:

$Vvs + Vve \leq Vb + Vc$.

If the above-indicated conditions are met, that ensures at any event that the regions of disturbed laminate do not occur in the middle portion of the section of material for forming the respective preform and from which the hollow body is to be formed as the finished product.

It is possible for the storage chambers for the thermoplastic material to be disposed in the extrusion head or outside same. Another possibility is for the storage chambers to be arranged partly in the extrusion head and partly outside same.

In accordance with another preferred feature of the invention, the number of storage chambers can correspond to the number of layers making up the laminate structure or the wall structure of the hollow body to be produced therefrom, although that is not necessarily the case.

In order to be able to adapt the volume of the communicating duct without serious difficulty to the volume required for the production of a specific hollow body, a further preferred feature of the invention provides that the volume of the communicating duct is steplessly variable within a given range. In that way it is possible to use the same extrusion head for the production of preforms of different volumes. A variation in volume will generally be necessary when the weight of the hollow body to be produced has to be altered or the extrusion unit has to be converted from the production of one kind of hollow body to the production of another kind. The volume of the communicating duct can be adapted to the respective volume of preform required by means of a displacer element which is for example in the form of an annular piston which forms a part of the boundary wall structure defining the communicating duct, in such a way that the volume of the communicating duct is appropriately defined by the position of the displacer element. Another option is for the region of the extrusion head in which the communicating duct is disposed to be formed by the selection of components of suitable sizes, in such a way as to provide the communicating duct volume required for the production of a given preform.

Further objects, features and advantages of the present invention will be apparent from the following description of preferred embodiments thereof.

BRIEF DESCRIPTION OF THE DRAWINGS

FIG. 11 is a view corresponding to that shown in FIG. 10, showing the parts thereof in a position at the end of the emptying stroke movement for emptying the storage chambers.

DESCRIPTION OF PREFERRED EMBODIMENTS

Referring firstly to FIGS. 1 through 7 of the accompanying drawing, the apparatus illustrated therein is designed for the production of hollow bodies, the wall of which comprises first, second and third layers. Accordingly, an extrusion head as indicated at 10, with which first, second and third extruders 12, 13 and 14 are operatively associated, has first, second and third ducts 17, 18 and 19 which are of an annular configuration in cross-section and which extend substantially coaxially with each other. The ducts 17, 18 and 19 are referenced in FIG. 2 and the annular, coaxial arrangement thereof can be clearly seen in FIG. 3.

Figure 1:
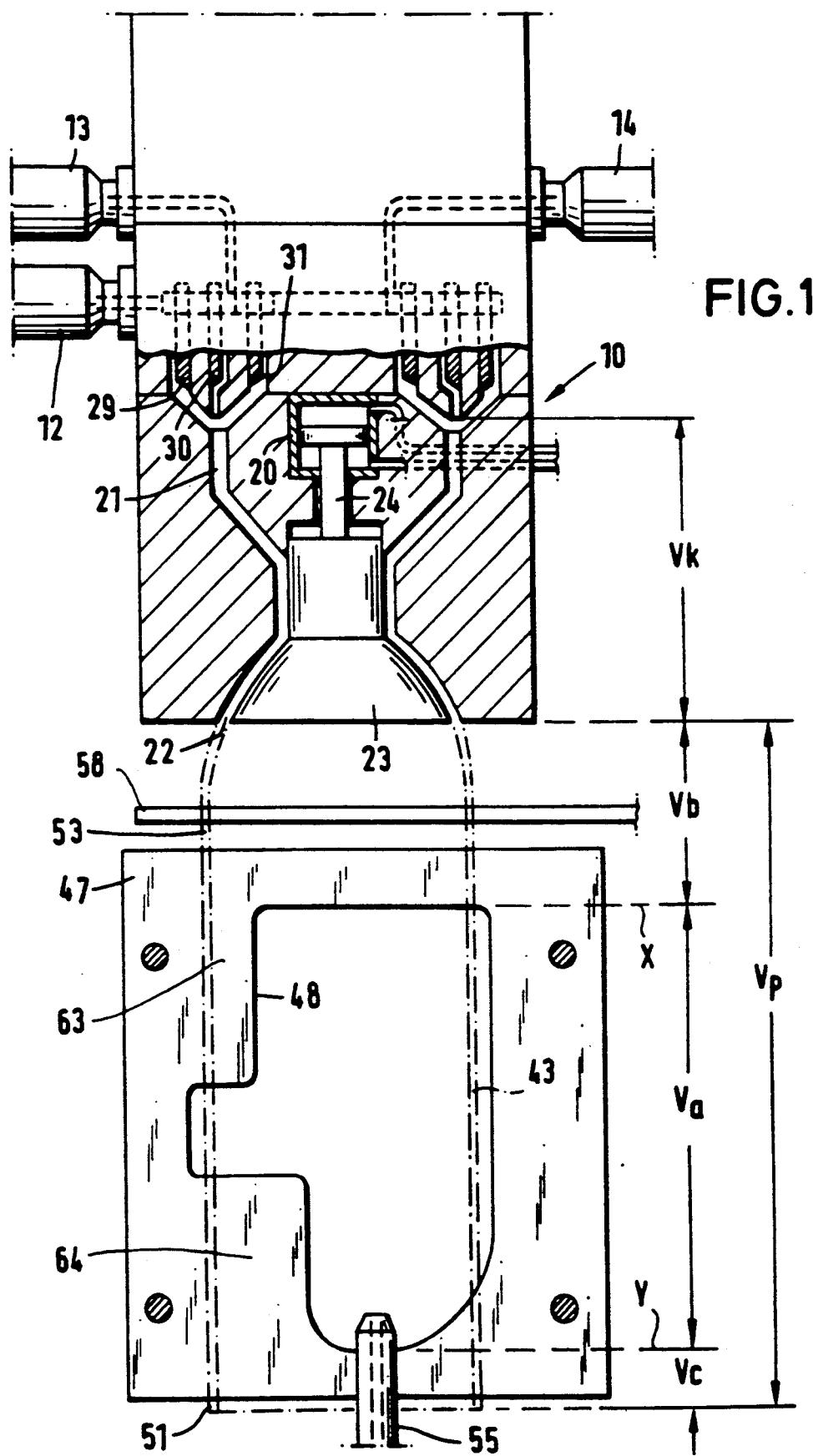
FIG. 1 is a diagrammatic side view, partly in section, of an extrusion blow molding apparatus with an extrusion head and associated blowing mold.
Figure 2:
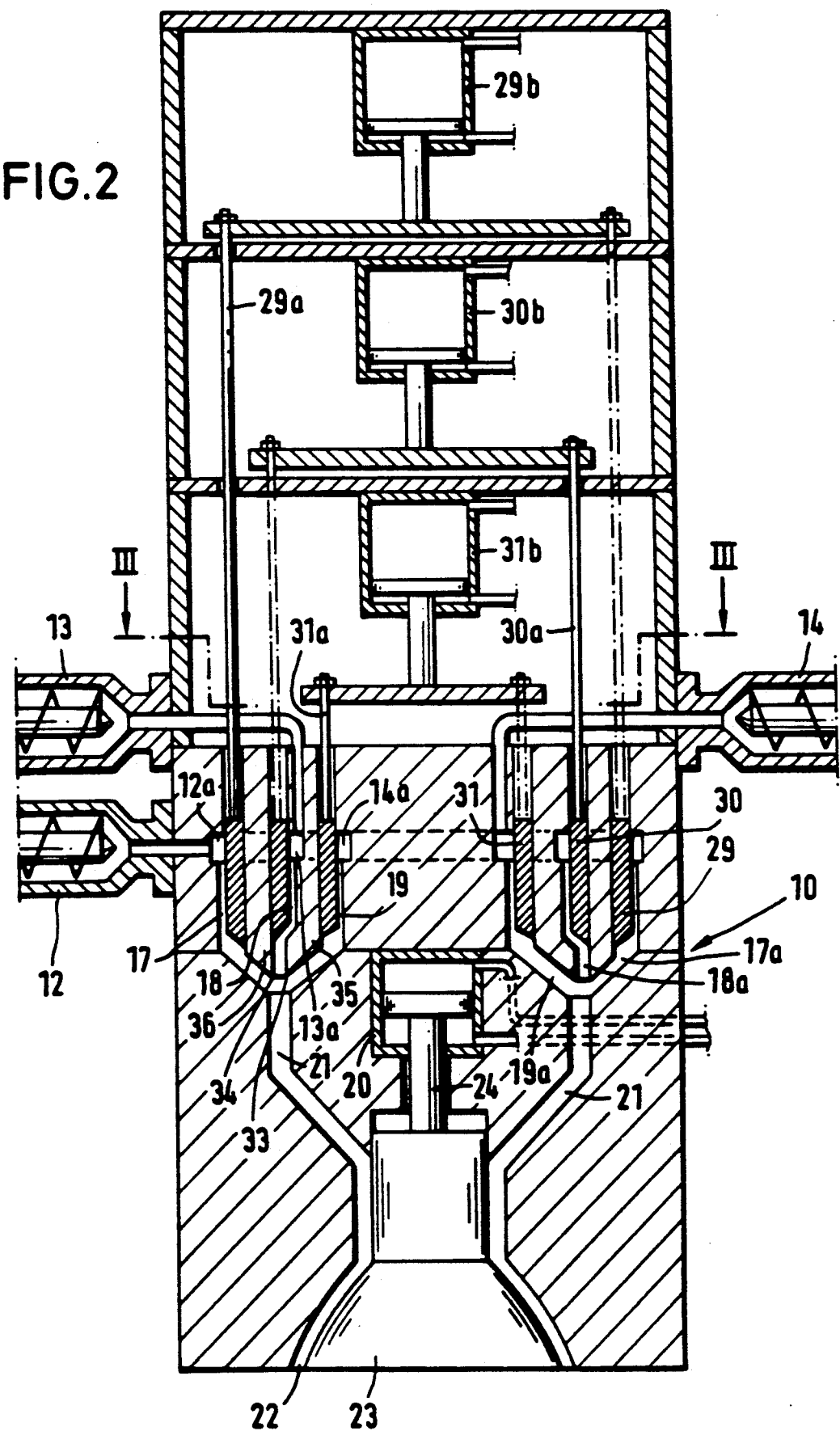
FIG. 2 is a diagrammatic view in longitudinal section through the extrusion head of FIG. 1.
Figure 3:
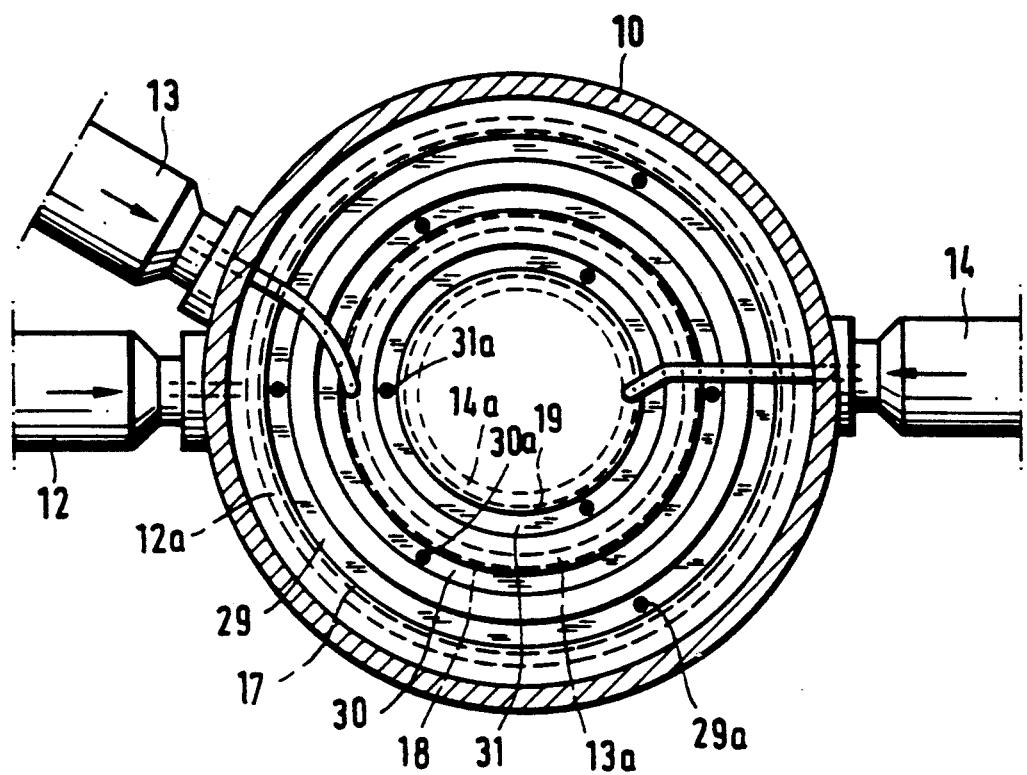
FIG. 3 is a view in section taken along line III—III in FIG. 2.

Each of the ducts 17, 18 and 19 is connected to a respective extruder, with the interposition of a respective annular distributor duct referenced 12a, 13a and 14a respectively in FIGS. 2 and 3. The ducts 17, 18 and 19 open into an annular communicating duct 21 which at the lower end of the extrusion head 10 communicates with an annular outlet opening 22, as indicated in FIG. 1. The outlet opening 22 is delimited on its inward side by a core 23 which is carried by a rod 24 connected to the piston of a piston-cylinder assembly 20. The core 23 can be displaced vertically by the piston-cylinder assembly 20 in order to vary the radial width of the outlet opening 22 and therewith the wall thickness of the preform to be produced by the apparatus. The wall thickness can be influenced by virtue of the fact that the core 23 is of a conically enlarging configuration in a downward direction, at least in the lower region of the core 23. The opening in the lower part of the extrusion head 10, which receives the core 23, is of a generally corresponding configuration, as can be clearly seen from FIG. 1.

Figure 6:
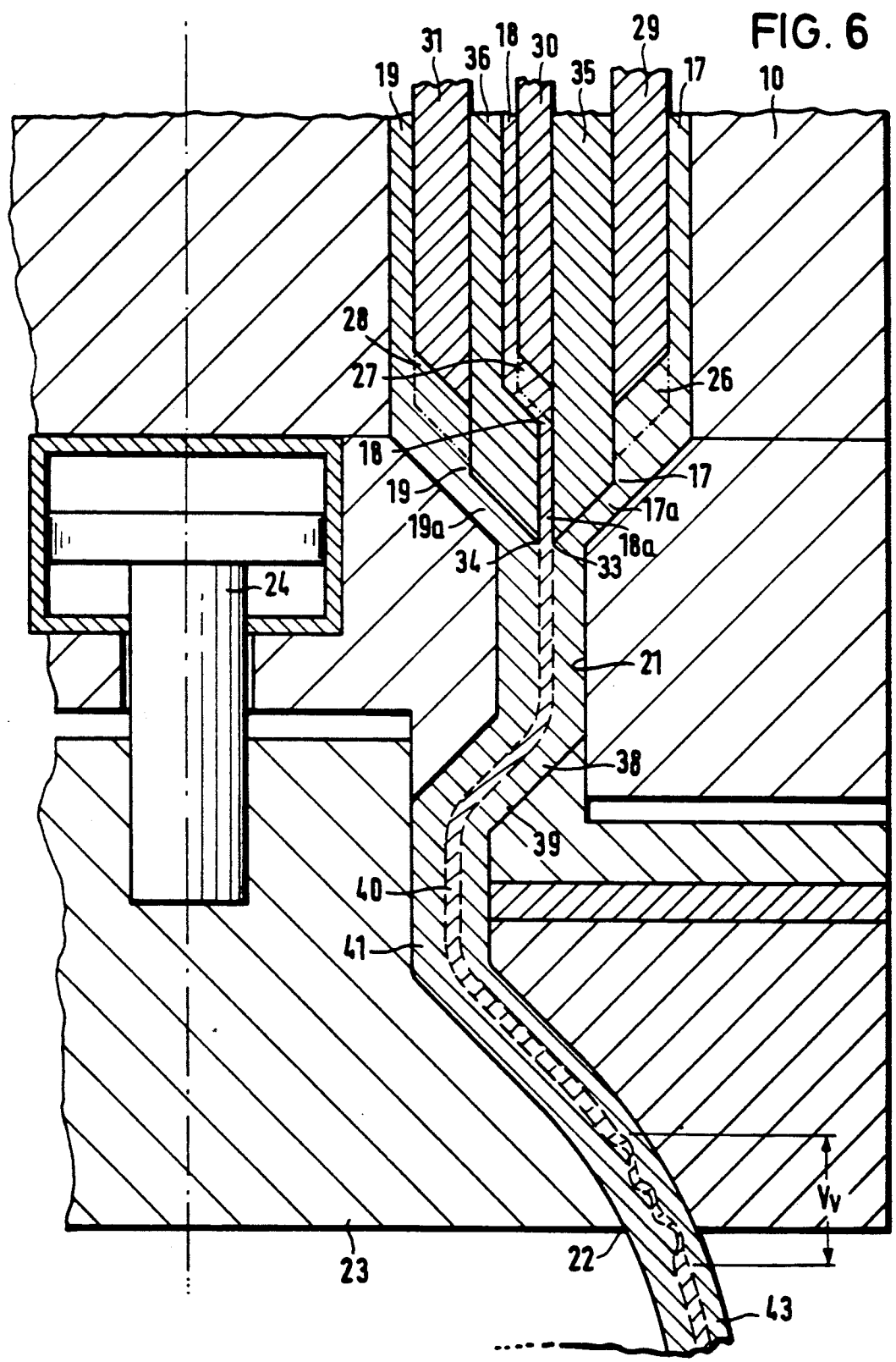
FIG. 6 is a view, partly in section, of a detail from the extrusion head, on a larger scale, with parts thereof in a position during the emptying stroke movement for emptying the storage chambers of the material contained therein.

Reference will now be made more particularly to FIG. 6 showing that, in the illustrated embodiment, an annular storage chamber 26, 27 and 28 is provided in each of the three ducts 17, 18 and 19. Operatively associated with each of the storage chambers 26, 27 and 28 is a respective annular piston as indicated at 29, 30 and 31 respectively. Each annular piston 29, 30 and 31 is connected by a respective rod or bar 29a, 30a and 31a to a respective hydraulic piston-cylinder assembly 29b, 30b and 31b, as shown in FIG. 2, to produce a movement of the pistons 29, 30 and 31 parallel to the longitudinal axis of the extrusion head 10 and thus the bar 24.

The arrangement and mode of operation of the pistons 29, 30 and 31 in the respective storage chamber 26, 27 and 28 correspond to the respective arrangement and mode of operation as described in German patent specification No. 1 704 791 and corresponding U.S. Pat. No. 3,611,494, in connection with an extrusion head having only one storage chamber and an annular piston, and the disclosure of U.S. Pat. No. 3,611,494 is hereby incorporated into the present specification. To explain matters, it will noted at this stage that the material which comes from the respective extruder 12, 13 and 14 through the respectively associated duct 17, 18 and 19 urges the respective annular piston 29, 30 and 31 upwardly and thus fills the associated storage chamber. As soon as the annular pistons 29, 30 and 31 have reached their upper end positions, which if possible should be at the same time, they are substantially simultaneously displaced downwardly into the respective lower end positions shown in FIG. 7, by suitable actuation of the associated piston-cylinder assembly, with the result that the plastic materials in the storage chambers are displaced towards the communicating duct 21 and therewith the outlet opening 22. During those piston stroke movements for emptying the storage chambers 26, 27 and 28, which take place simultaneously, additional material is moved through the ducts 17, 18 and 19 towards the communicating duct 21 by the extruders 12, 13 and 14, if the extruders continue to operate. However the amount of material which is displaced in that way and which is to.be attributed to operation of the extruders during the ejection stroke movement of the respective pistons is relatively small.

The portions of material leaving the storage chambers 26, 27 and 28 pass through the duct portions 17a, 18a and 19a respectively which adjoin the storage chambers, into the communicating duct 21 in which the individual flows of material, after passing the lower peripherally extending end edges as indicated at 33 and 34 of peripherally extending separating wall portions 35 and 36 which delimit the storage chambers 26, 27 and 28 and the ducts 17, 18 and 19 respectively, combine together to form a laminate-structure flow of material as indicated at 38 in FIG. 6. The flow 38 comprises first, second and third layers of material as indicated at 39, 40 and 41 in FIG. 6. Of those layers, the layer 39 comes from the duct 17 and thus the associated extruder 12, the middle layer 40 comes from the duct 18 and the associated extruder 13 and the third layer 41 comes from the duct 19 and the associated extruder 14.

Referring now again to FIG. 6, shown therein is the condition of the apparatus during the phase of ejection of the material for forming a preform as indicated at 43. The annular pistons 29, 30 and 31 are in a position just short of the lower end position which is shown in broken lines in FIG. 6, that is to say, just prior to conclusion of the ejection operation. In this embodiment the layers 39 and 41 of the laminate structure 38 are of approximately the same thickness while the middle layer 40 is substantially thinner. Accordingly the storage chamber 27 for accommodating the material for forming the middle layer 40 is substantially smaller than the other two storage chambers 26 and 28 for receiving the materials for forming the layers 39 and 41 respectively. During the ejection operation, a condition of equilibrium in respect of pressure occurs in the system formed by the individual flows of material and the laminate 38 so that at the laminate-formation region, the flows of material forming the layers 39, 40 and 41, on leaving the portions 16a, 18a and 20a as referenced in FIG. 2, of the associated ducts, combine together to form a laminate 38 which is of a regular configuration in regard to thickness and relative arrangement of the individual layers. In the embodiment of the invention as illustrated in FIGS. 1 through 7, the laminate-formation region is in or immediately below the plane which contains the end edges 33 and 34 of the two separating wall portions 35 and 36. In that connection, the choice of materials for forming the individual flows is such that at their contact surfaces, the resulting layers 39, 40 and 41 are securely held or bonded together.

However, in normal circumstances, such a pressure equilibrium which is favourable in regard to the formation of a uniform and regular laminate will not occur in the above-indicated system at the beginning and/or at the end of each emptying stroke movement. There may be a number of reasons for that to be the case. One of the reasons may be that most thermoplastic materials and materials which are comparable thereto, as are used for the production of multi-layer hollow bodies, do not behave like an ideal liquid in the plasticised condition, but can be compressed under a compression force to a certain degree. On the other hand, when the effect of a compression force acting on the plastic material is removed, decompression occurs, possibly with a certain delay in respect of time, with the result that the volume of the material correspondingly increases.

The result of the above-indicated property of most plastic materials is that, in the first phase of the emptying stroke movement for emptying the storage chambers, the movement of the respective pistons initially produces a certain compression effect before the individual flows of material begin to move, due to the displacement of the pistons, at the lower end of the storage chamber and thus also at the laminate-formation region, in the plane of the edges 33 and 34. That would possibly give rise to few problems if all the materials forming the respective flows behaved in the same manner and the storage chambers were of the same volume, with their ducts. However that is not the case. On the contrary, different materials can be compressed to different degrees. Added to that is the fact that the delay in respect of movement of the materials at the laminate-formation region at the edges 33 and 34, such delay being caused by the compressibility of the materials as just described above, is also influenced by the volume of the individual portions of material which are subjected to the compression loadings by the respectively associated pistons. In the embodiment illustrated in FIGS. 1 through 7 of the drawing, the volume of each of the two storage chambers 26 and 28 is substantially greater than that of the storage chamber 27 for forming the middle layer 40 of the laminate. Accordingly, in relation to any amount of material stored in one of the storage chambers 26 and 28 respectively, the absolute variation in volume is normally greater than in the case of the substantially smaller amount of material contained in the storage chamber 27, with the result that, when the three annular pistons 29, 30 and 31 move synchronously during the emptying stroke phase, the material in the storage chamber 27, at the lower end thereof and thus in the laminate-formation region at the edges 33 and 34, begins to move under the effect of the associated piston 30, earlier than the material at the lower ends of the other storage chambers 26 and 28.

Another influencing factor which can also interfere with the condition of equilibrium in respect of pressure in the system in the apparatus is variations in the flow conditions to which the individual flows of material are subjected, prior to coming together to form the laminate. That is to be attributed in particular to different flow resistances which are caused by virtue of the fact that the amounts of materials for the individual layers differ and normally the ducts through which the flows of material pass are also of different cross-sectional areas. A duct or storage chamber of smaller cross-sectional area exhibits a higher degree of flow resistance than a duct of large cross-sectional area.

All those influences which occur essentially simultaneously and which are thus superimposed on each other and which cannot be readily defined in respect of their magnitude and in regard to the effects thereof initially produce an effect in the first phase of the ejection operation, with the result that in the laminate-formation region, that is to say directly beneath the lower edges 33 and 34, there is a condition of pressure imbalance which means that the layers of the laminate structure begin their flow movement in an irregular fashion and are irregularly positioned, in terms of their absolute and relative positions, while also being of thicknesses which possibly differ from their respective reference thicknesses. However, as soon as the entire system consisting of the flows of material and the laminate structure is in uniform motion under the effect of the emptying stroke movements of the pistons, a condition of pressure equilibrium occurs, which provides for the formation of a laminate of regular and uniform structure.

A further irregularity may occur at the end of the emptying stroke movement of the pistons, in particular by virtue of the material forming the individual layers experiencing an expansion or decompression effect which occurs at that time, after the pressure forces applied by the pistons 29, 30 and 31 to the material cease to be so applied. In that situation the disadvantageous effects remain restricted to the region of the laminate-formation location directly adjoining the edges 33 and 34 as the pressure equalisation effect which thus occurs at the end of the emptying stroke movement produces its effect only in the ducts 17, 18 and 19 with the respectively associated storage chambers, where it is generally harmless, and in the laminate-formation region. The disturbed region of the laminate which is formed in that situation, that is to say at the end of the emptying stroke movement, is directly adjoined by the disturbed laminate region which is produced at the beginning of the emptying stroke movement of the following operating cycle, so that the disturbed laminate portions which are produced at the beginning and the end of a given emptying stroke movement represent an overall region of disturbance which is produced in two successive working cycles. The length of the overall region of disturbance is very short in the direction of flow of the material at any event if, as in the case of the embodiment shown in FIGS. 1 through 7, all the edges 33 and 34 of the respective separating wall portions 35 and 36 are disposed in one plane and thus the laminate-formation region is only of a very short extent as considered in the direction of flow of the material.

However, even if the axial extent of the laminate-formation region within the extrusion head is somewhat larger, as is the case for example with the embodiment shown in FIGS. 10 and 11, as will be described in greater detail hereinafter, the axial extent of the disturbed region in the laminate is still not very long since, as described above, the influences which give rise to the disturbance in the laminate structure, at the end of an emptying stroke movement and at the beginning of the emptying stroke movement of the following working cycle, can act substantially on the same region of the laminate, in the laminate-formation area of the apparatus.

Referring now to FIG. 6, shown therein is the laminate as it flows through the communicating duct 21, just prior to the termination of the emptying stroke movement of the pistons. The laminate consisting of the layers 39, 40 and 41 is of a regular and disturbance-free structure, in the region of the laminate-formation location in the apparatus, as in that phase of manufacture of a preform 43, a condition of equilibrium in respect of pressures obtains throughout the entire system and thus also at the laminate-formation region. Accordingly all the layers of the laminate structure are of the correct thickness and relative association, in the region of the laminate-formation location. It is only in the region of the outlet opening 22 of the apparatus that we find a portion Vv of disturbed laminate, comprising first and second sub-portions Vve and Vvs, which are identified in FIG. 7 and which occur due to the above-described influences at the end of the preceding emptying stroke movement and at the beginning of the emptying stroke movement which is currently being performed.

Figure 7:
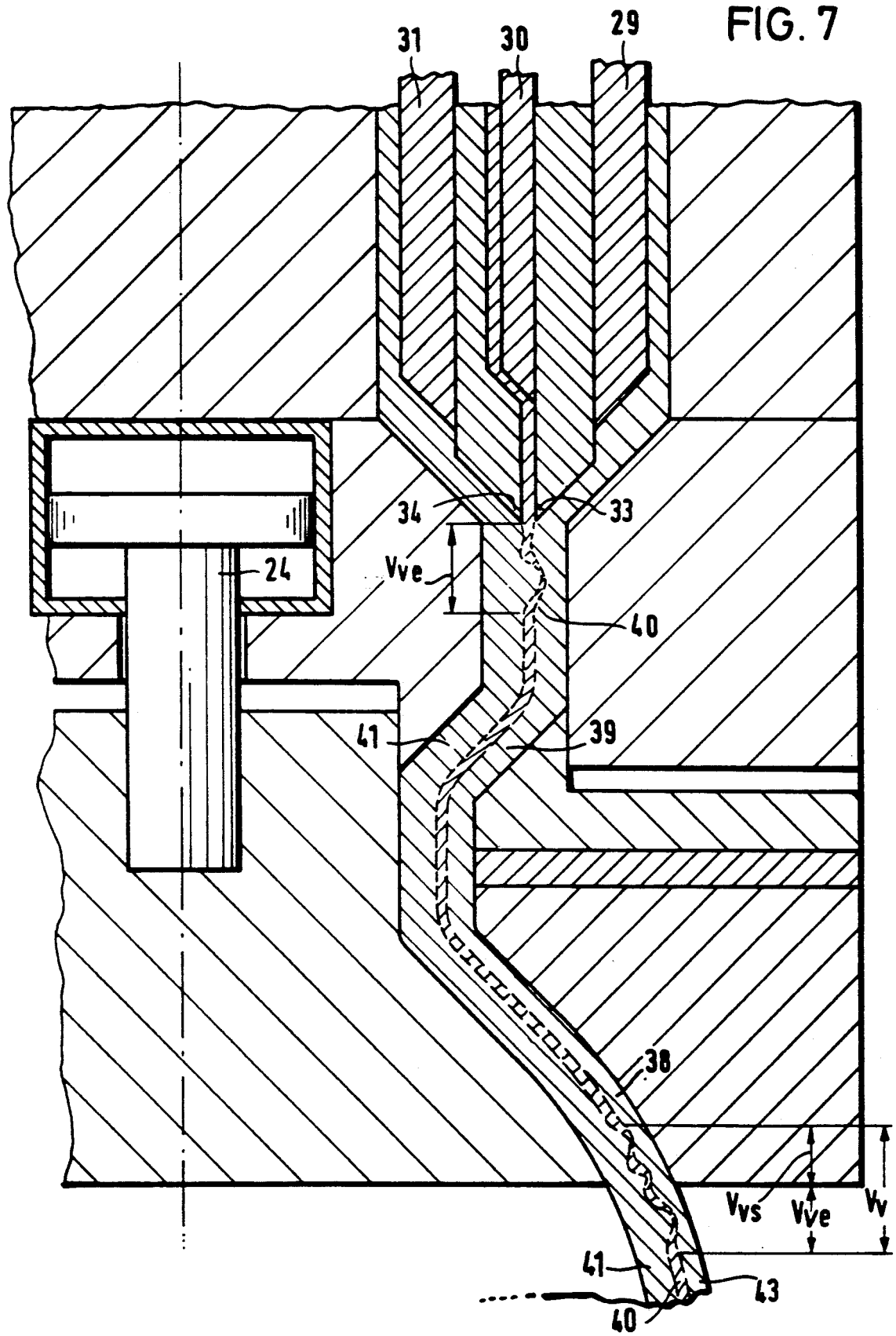
FIG. 7 is a view corresponding to that shown in FIG. 6 but showing the parts in a position at the end of the emptying stroke movement.

As soon as the pistons 29, 30 and 31 have reached their lower position at the end of the emptying stroke movement thereof, as shown in FIG. 7, the pressure conditions in the extrusion head change as the pressure applied by the respective pistons 29, 30 and 31 to the respective individual flows produced thereby ceases. The pistons are now displaced upwardly again towards their upper end positions, under the effect of the material coming from the respectively associated extruder, while at the same time the storage chambers 26, 27 and 28 are filled with material for the preform 43 which is to be produced in the next following working cycle. That situation can again result in variations in the pressure conditions in the extrusion head 10 so that different pressures occur in the individual ducts 17, 18 and 19 and possibly in the associated storage chambers 26, 27 and 28 respectively. The different flow characteristics in respect of the individual flows of material through the respective ducts 17, 18 and 19 are not of major significance under normal operating conditions as the flows in question are not yet combined together to form the laminate structure, in that region of the system. It is however inevitable that, when different pressures obtain in the individual ducts 17, 18, 19 and the associated storage chambers, a pressure equalisation effect occurs within that system. That can occur essentially only over the region in which the laminate structure is formed, that is to say immediately beneath the above-mentioned edges 33 and 34, as it is in that region that the individual ducts 17, 18 and 19 are communicated by way of the portions 17a, 18a and 19a with the adjoining communicating duct 21. That necessarily means that, in the region of the mouth openings of the duct portions 17a, 18a and 19a, where those duct portions communicate with the communicating duct 21, that is to say in the laminate-formation region of the apparatus, the material which is contained in that area of the apparatus and which already forms a laminate structure is displaced from the region which is at a higher pressure into the region which is at a lower pressure. As the embodiment shown in FIGS. 1 through 7 has a total of three ducts 17, 18 and 19 so that three different pressure levels may therefore occur, the movements of the material for forming the laminate, which occur in order to produce the condition of pressure equilibrium and which take place substantially transversely with respect to the main direction of flow of the laminate 38, are uncontrolledly superimposed on each other at that location, with the result that the laminate 38 has a region Vve in which the individual layers 39, 40 and 41 are each of a thickness which differs from the respective reference thickness in respect thereof, and can also vary in position. Thus, reference may be made to FIGS. 6 and 7 showing possible configurations that may be adopted by the disturbed portion which is produced by the pressure equalisation effect at the beginning and the end of the emptying stroke movement of the pistons. In that disturbed portion for example the middle layer 40 is very much thinner and is in fact only partially present, as indicated. In addition the configuration of the interfaces between the layers 39, 40 and 41 is totally irregular, which in turn means that in those areas the layers are each of a thickness which is markedly different from the desired thickness thereof.

After the operation of filling the storage chambers 26, 27 and 28 has been concluded, that is to say after the pistons 29, 30 and 31 have reached their upper end positions, the procedure then involves production of the preform 43 which represents an overall portion in terms of volume, for the next working cycle. For that purpose, for emptying of the storage chambers 26, 27 and 28, the pistons 29, 30 and 31 are moved again from their upper end position into the lower end position which is shown in FIG. 7. As already described above, at the beginning of the emptying stroke movement, a condition of pressure imbalance may again occur in the system, which, at the laminate-formation location directly beneath the edges 33 and 34 of the separating walls 35 and 36, results in uncontrolled movements of the individual layers of the laminate which is already present at that point. The resulting disturbance in the configuration of the layers in the portion indicated at Vvs in for example FIG. 7 will generally occur following the portion Vve which had already been disturbed at the end of the preceding emptying stroke movement, by virtue of the above-discussed influences acting in that respect; in that first phase of the emptying stroke movement, the laminate which is disposed in the communicating duct 21 may already suffer from displacement towards the outlet opening 22 so that in that way the portion Vve of disturbed laminate which is already in existence in the arrangement, experiences a displacement by the length of the portion Vvs in the direction of flow of the material, with the two portions Vve and Vvs together forming the portion Vv of disturbed laminate. The disturbances which are caused at the beginning of the emptying stroke movement may possibly extend into the portion Vve which has already experienced disturbance in the preceding phase of the operation, so that the portions Vve and Vvs are possibly not clearly distinguishable from each other. As soon as the condition of pressure equilibrium has occurred in the course of the emptying stroke movement, the laminate will also be of an undisturbed configuration as shown for example in FIG. 6, in the region of the laminate-formation location.

Figure 4:
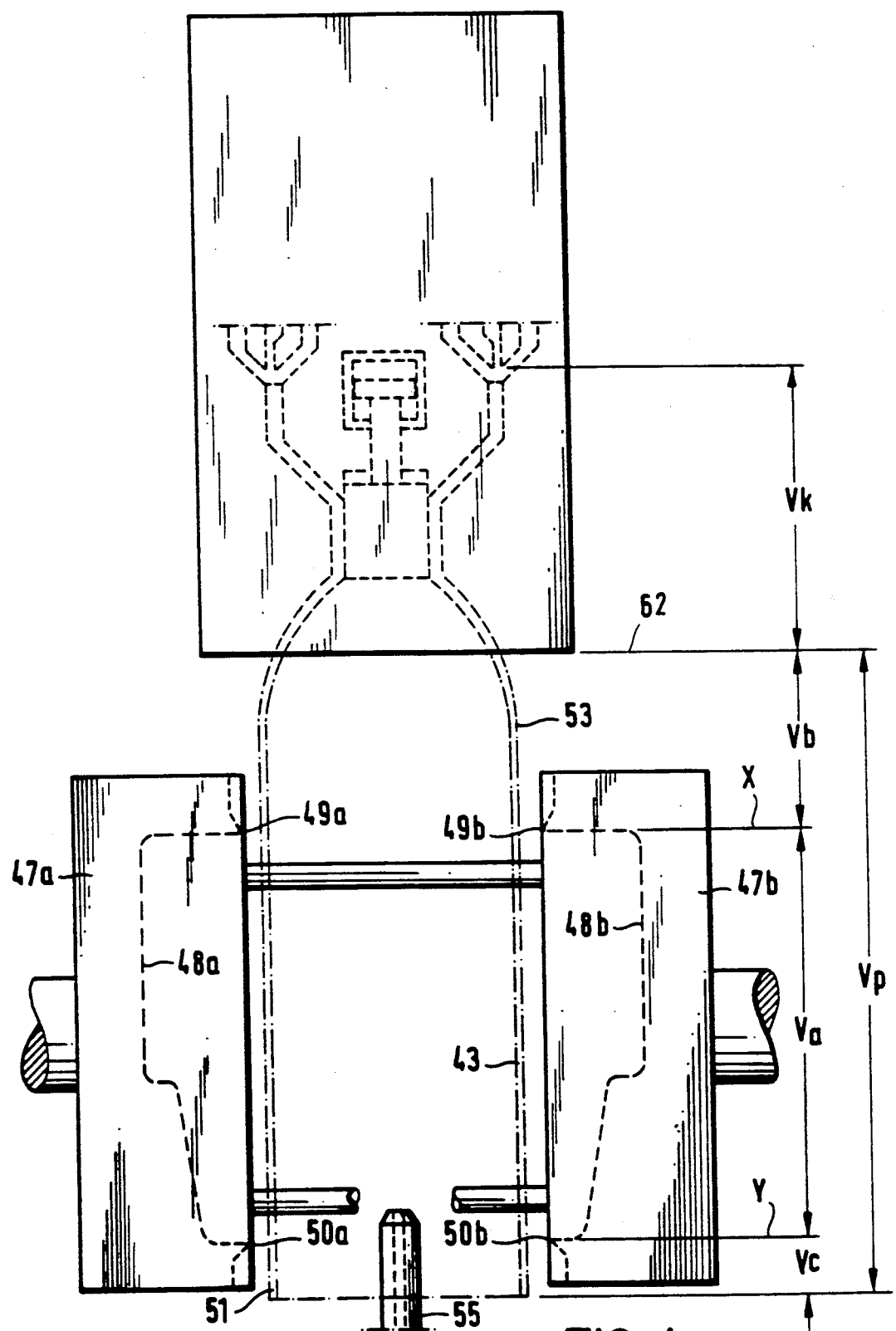
FIG. 4 is a diagrammatic front view of the extrusion blow molding apparatus shown in FIG. 1, with the blowing mold in an opened condition.
Figure 5:
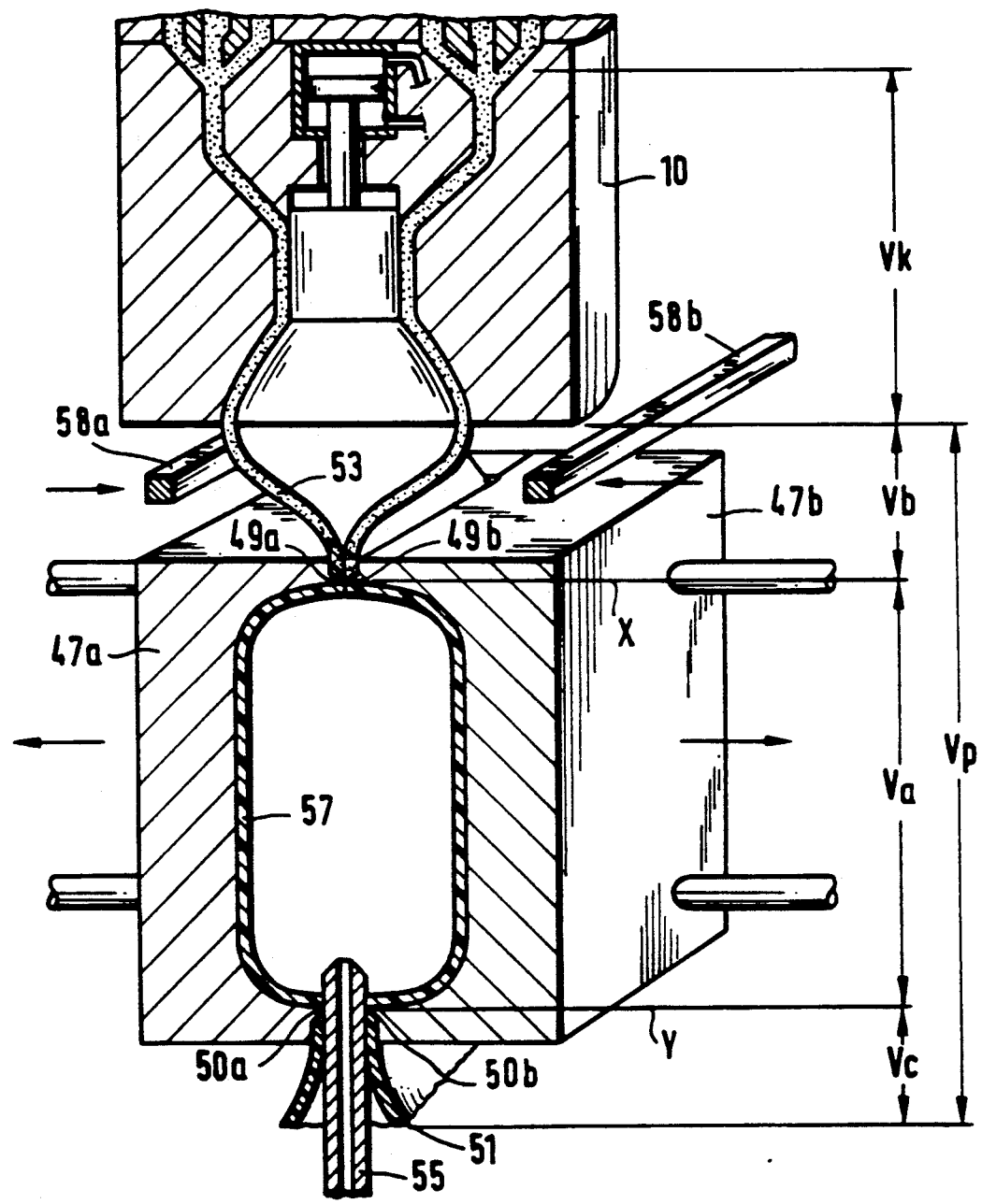
FIG. 5 is a perspective view of the extrusion blow molding apparatus shown in FIG. 1, with the blowing mold in a closed condition.

As shown for example in FIGS. 4 and 5, disposed beneath the extrusion head 10 is a blowing mold 47 which consists of two parts 47a and 47b. The two parts of the mold are each provided with a recess 48a and 48b at their mutually facing sides. When the mold is in the closed condition shown in FIG. 5, the recesses 48a and 48b combine to form a mold cavity 48 within the mold.

The mold halves 47a and 47b are also provided with squeeze-off edges indicated at 49a, 49b, 50a and 50b in FIGS. 5 and 6, at least in the regions at which excess material is to be squeezed off the preform 43 when the mold is closed by virtue of the two mold halves 47a and 47b coming together. That is normally the case at the two ends of the preform 43.

When the preform 43 is ejected from the extrusion head 10, the mold 47 is open (see FIG. 4). The overall portion Vp of material (as shown in FIGS. 4 and 5) which forms the preform 43 and which is initially disposed between the two parts 47a and 47b of the opened mold 47 is longer than the vertical dimension of the mold cavity 48. At the lower end of the mold cavity 48 the overall portion Vp of material which constitutes the preform 43 has an end portion Vc which, in the embodiment illustrated in FIGS. 1 through 7, is disposed beneath the tangent y which extends normal to the longitudinal axis of the preform 43 at the squeeze-off edges 50a and 50b which are disposed at that end of the mold. The upper end of the overall portion Vp of material forming the preform 43 has an end portion as indicated at Vb in FIGS. 4 and 5, which is disposed above the tangent x at the squeeze-off edges 49a and 49b on the mold parts 47a and 47b, that is to say the tangent is also outside the mold cavity 48. When the mold 47 is closed by movement of the two mold parts 47a and 47b from the position shown in FIG. 4 into the position shown in FIG. 5, the end portions Vc and Vb which are to be found on the preform 43 at the top and bottom ends thereof is squeezed off by the associated edges 50a, 50b and 49a, 49b respectively, constituting excess material representing waste which is generally recycled.

Referring now again to FIG. 1, it will be seen therefrom that portions 63 and 64 of the preform 43 are also disposed outside the mold cavity 48 at the left-hand side region thereof. In other words, the preform 43, possibly after having been subjected to a pre-expansion operation by means of an increase in its internal pressure, is of a diameter which in some portions of the preform 43 is larger than the corresponding transverse dimension of the mold cavity 48. That means that the portions 63 and 64 of the preform 43 which project laterally beyond the side of the mold cavity 48 at the left in FIG. 1 are squeezed off by the edges of the mold 47 when the mold is closed, thus giving rise to further waste portions. Such a mode of operation is sometimes necessary, in particular when the article to be produced is of a complicated configuration. That procedure is part of the state of the art and is not a part of the present invention which is concerned with the waste portions 51 and 53 which are produced above and below the respective tangents x and y as described above.

The region of the middle portion Va of the preform 43, which remains within the mold cavity 48 and thus between the squeeze-off edges 50a and 50b on the one hand and 49a, 49b on the other hand is expanded until it comes to bear against the inside surface of the mold cavity 48 by means of a pressure fluid which is introduced through a blow molding mandrel 55 into the interior of the region of the middle portion Va of the preform 43, which is in the mold cavity 48. That phase of operation of the arrangement produces the article indicated at 57 for example in FIG. 5, which at its two ends has the two flash or waste portions 51 and 53 which are formed by the excess material originating from the end portions Vc and Vb of the preform 43. Those waste portions 51 and 53 generally remain joined to the expanded article 57 by way of thin web portions which are severed when the waste portions 51 and 53 are removed. The operation of removing the waste portions 51 and 53 is mainly effected after the operation of opening the mold 47. When the article 57 is an article of substantial size, the article can be removed from the mold 47 by a gripper arrangement as indicated at 58 and comprising first and second members which are diagrammatically indicated at 58a and 58b for example in FIG. 5, to engage the waste portion 53.

When the article 57 is removed from the mold 47, the upper end of the waste portion 53 which represents the excess material or flash is torn off at the outlet opening 22 of the extrusion head because it is at that point that the material is still at the hottest temperature and is thus softest.

The length and therewith the volume of the overall portion Vp which represents the preform 43 are determined in this case by the distance between its lower end and the outlet opening 22 of the extrusion head 10. The volume of the portion constituting the preform 43 consists of the sum of the volumes defined by the stroke movements of the pistons 29, 30 and 31, plus the material which is conveyed into the extrusion head 10 during the emptying stroke movement of the pistons 29, 30 and 31 while the extruders 12, 13 and 14 continue to operate. In the case of the embodiment illustrated in FIGS. 1 through 7 of the accompanying drawing, the length of the communicating duct 21 between the laminate-formation location in the region of the edges 33 and 34 and the outlet opening 22 of the extrusion head 10 is so selected that the volume Vk of the communicating duct 21 corresponds to the volume Vp of material constituting a preform 43. In other words, the material which is conveyed into the communicating duct 21 after an emptying stroke movement by the pistons 29, 30 and 31 and possibly additionally by the extruders as they continue to operate remains therein in the form of a laminate for the duration of a working cycle before, in the subsequent working cycle, it is then ejected from the extrusion head 10 through the outlet opening 22 thereof, and is separated off at the opening 22.

The above-indicated arrangement affords the advantage that the disturbed regions in the laminate which possibly occur upon each emptying stroke movement of the pistons occur in the preform to be produced from the laminate, that is to say after leaving the extrusion head 10, in at least one of the two end portions Vb or Vc of the preform, which remain outside the mold cavity 48 when the mold 47 is closed and which therefore are not a part of the article 53 which is produced by expansion by a blowing operation in the mold cavity 48.

It will be seen from the foregoing description relating to the embodiment shown in FIGS. 1 through 7 that the overall portion of material which constitutes the extruded preform 43 is composed of the middle portion indicated at Va in for example FIG. 1 and which occurs between the upper squeeze-off edges 49a, 49b of the mold 47 or the plane indicated by the line x, and the lower squeeze-off edges 50a and 50b or the plane indicated by the line y, which edges co-operate with the peripheral surface of the blow molding mandrel 55 in the operation of squeezing off the waste material or flash portions, in conjunction with the end portions Vb and Vc. The end portion Vb corresponds to the volume of the upper waste portion 53 and extends between the outlet opening 22 and the upper squeeze-off edges 49a, 49b or the plane x. The portion Vc corresponds to the volume of the waste portion 51 and extends between the free end of the preform 43 and the lower squeeze-off edges 50a, 50b or the plane y. In the embodiment illustrated in FIGS. 1 through 7, the lateral regions 63, 64 of the preform which, by virtue of the configuration of the mold cavity 48 (see FIG. 1), are also squeezed off when the mold 47 is closed, count as part of the portion Va of the preform from which the article is produced.

In a modification of the embodiment described above with reference to FIGS. 1 through 7, the volume indicated at Vk of the communicating duct 21 may also correspond to an integral multiple of the volume Vp of the overall portion which constitutes the preform 43. The effect which is produced in both cases will now be described with reference to FIGS. 8a and 8b which are highly diagrammatic views in longitudinal section through one half of that region of the extrusion head 10 which includes the communicating duct 21. Between the laminate-formation location, which is approximately the plane in which the two peripherally extending end edges 33 and 34 of the two separating walls 35 and 36 of the extrusion head are disposed, and the outlet opening 22, the communicating duct 21 is of a volume indicated at Vk which amounts to 2 Vp and which accordingly is of such a size that it corresponds to the volume of material which is required to produce two preforms 43 that are to be extruded in succession.

Figure 8A:
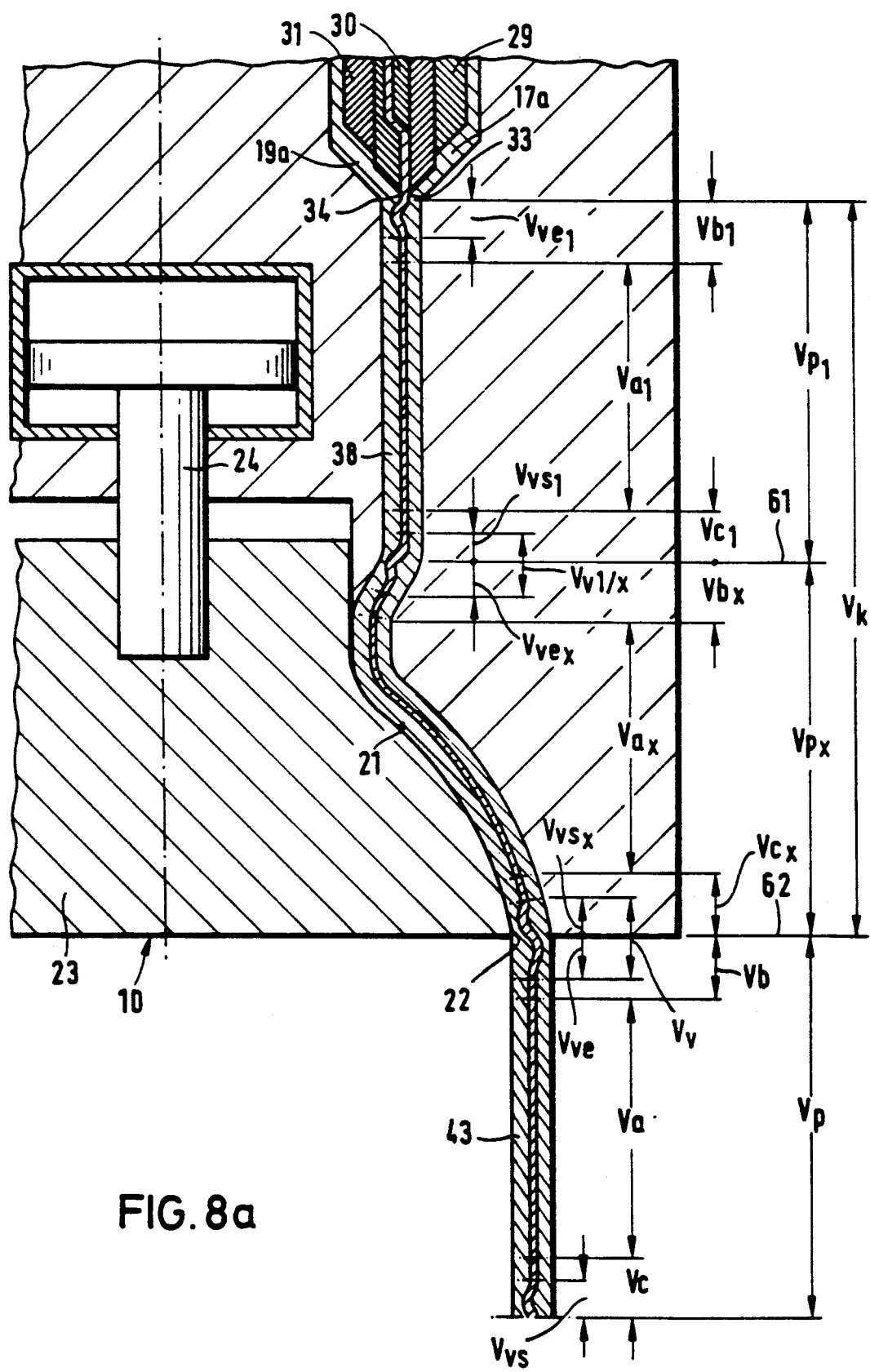
FIG. 8a is a diagrammatic view in longitudinal section of the region of an extrusion head between a laminate-formation region and the outlet opening, in a second embodiment of the invention.
Figure 8B:
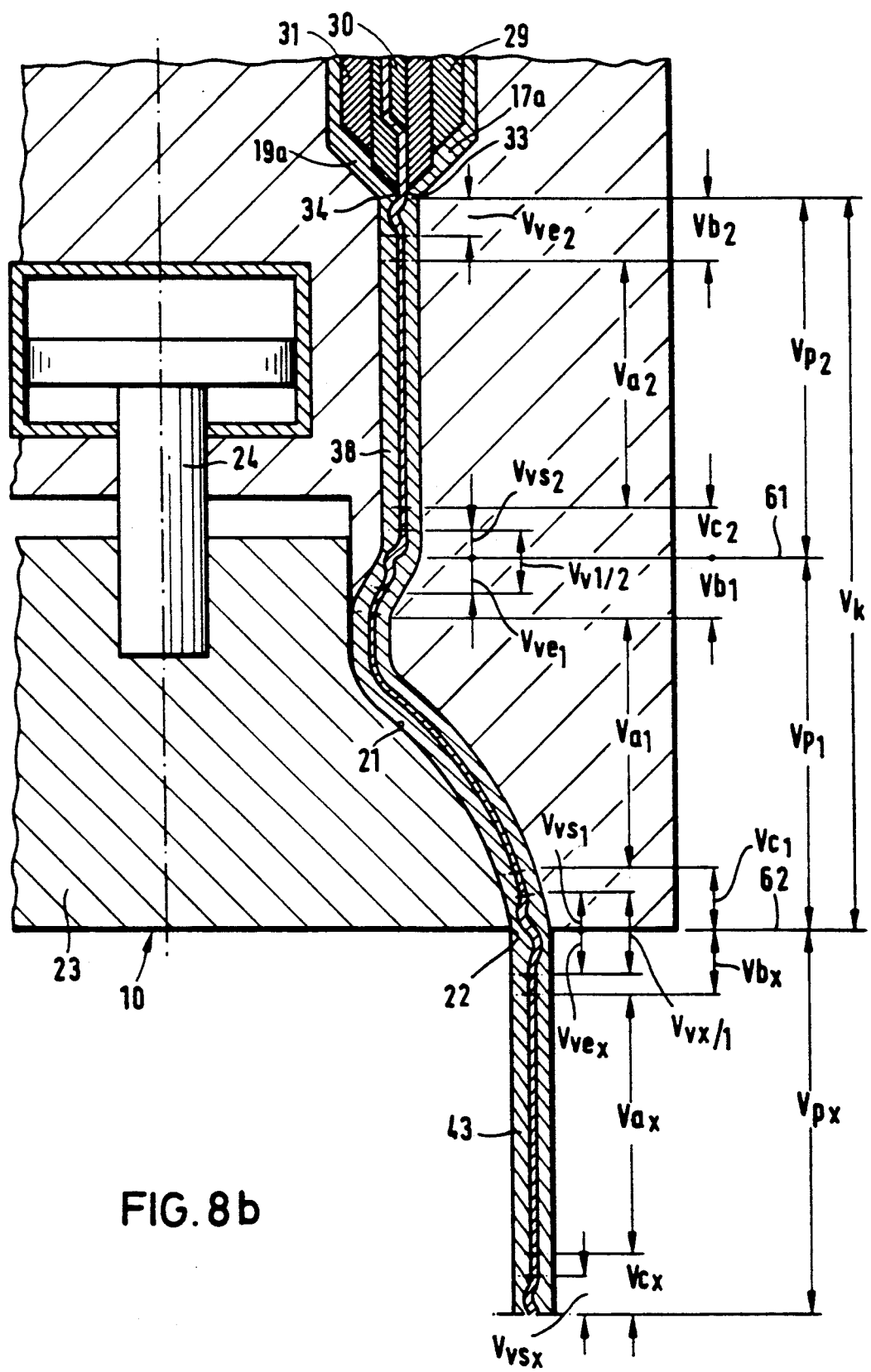
FIG. 8b is a view corresponding to that shown in FIG. 8a at the end of the following working cycle.

FIGS. 8a and 8b show the operating conditions at the end of respective ones of two successive emptying stroke movements of the pistons 29, 30 and 31 operatively associated with the respective storage chambers. In the operating condition shown in FIG. 8a, at the end of the first emptying stroke movement, the communicating duct 21 contains the two overall portions of material, as indicated at Vp1 and Vpx, which are arranged in succession in the direction of flow of the laminate through the communicating duct and each of which is equal to the volume Vp required for a preform 43, in accordance with the above-indicated requirement. The portion Vpx is disposed directly upstream of the outlet opening 22 in the condition shown in FIG. 8a while the portion Vp1 fills the region between the portion Vpx and the laminate-formation location at the edges 33 and 34 of the extrusion head. Immediately below the edges 33 and 34, the laminate which forms the portion Vp1 has a portion Vve1 of disturbed laminate, the formation of which at the end of the last emptying stroke movement of the pistons had already been described in relation to FIGS. 6 and 7. Therefore the portion Vve1 forms the region of the portion Vp1 which is the trailing end region as considered in the direction of flow of the laminate; it is arranged within the end portion Vb1 but is shorter than the latter.

In the following working cycle, in the course of the emptying stroke movement of the pistons 29, 30 and 31 operatively associated with the respective storage chambers, the portion indicated at Vp1 is displaced towards the outlet opening 22 and thus into the position which was previously occupied by the portion Vpx; at the same time the previous portion Vpx is ejected from the extrusion head to form a respective preform 43. FIG. 8b shows the operating condition of the arrangement at the end of that emptying stroke movement. At the beginning of the emptying stroke movement, the material is affected at the laminate-formation location by the irregular build-up of pressure and other factors, with the result that the laminate which is formed in the first phase of the emptying stroke movement in the communicating duct 21 may also be disturbed. Accordingly the portion Vve1 of disturbed laminate, which forms part of the overall portion Vp1 of material, is increased in length by an upwardly adjoining further portion Vvs2 of disturbed laminate, with the two portions Vve1 and Vvs2 forming the portion Vv1/2 of disturbed laminate. Accordingly, at the end of that emptying stroke movement, the operating condition is one in which the disturbed portion Vv1/2 extends with its portion Vvs2 over a part of the end portion Vc2 of the overall portion Vp2, and with the portion Vve1 over a part of the end portion Vb1 of the overall portion Vp1 which is now diposed directly adjoining the outlet opening 22 of the extrusion head 10. In other words, the notional plane of separation 61 between the portions Vp2 and Vp1 passes through the disturbed portion Vv1/2 and subdivides it in such a way that the portion Vvs2, which is remote from the outlet opening 22, of the disturbed portion Vv1/2, is part of the overall portion Vp2 and is within the same part of the end portion Vc2 and therewith a subsequent waste portion 51, while the portion Vve1, which is towards the outlet opening 22, of the disturbed portion Vv1/2 is part of the overall portion Vp1 and within the same part of the end portion Vb1 from which a waste portion 53 is produced. The two portions Vvs2 and Vve1 of the disturbed portion Vv1/2 are shorter than the respective end portions Vc2 and Vb1 respectively, so that the disturbed Vv1/2 does not extend into the respective middle portion Va1 or Va2 respectively, from which an article 57 is produced by being expanded in the mold 47.

A corresponding situation also applies in regard to the other overall portions Vp as shown in FIG. 8a and Vpx as shown in FIG. 8b, the respective portions and regions of which are denoted by corresponding reference characters.

In the subsequent working cycle the overall portion Vp1 is ejected through the outlet opening 22 of the extrusion head 10 so that, at the end of the emptying stroke movement, as an overall portion which is suspended from the extrusion head, it forms a preform 43 and thus occupies the position held by the overall portion Vp in FIG. 8a. The overall portion Vp2 then occupies the position of the overall portion Vpx in FIG. 8a. The following description is therefore set forth with reference to the two overall portions Vp and Vpx in FIG. 8a. The plane in which the outlet opening 22 is disposed represents the plane of separation between the two overall portions Vp and Vpx. The separating plane 62 is not notional as, after the blowing mold has been closed around the preform and possibly after expansion of the preform 43 in the blowing mold 47, the overall portion Vp, that is to say the article 57 produced therefrom and its waste portion 53 which corresponds to the portion Vb of material, is separated in the plane 62 from the material in the extrusion head 10, that is to say the portion Vpx.

Similarly to the plane 61, the separating plane 62 also passes through the portion Vv of disturbed laminate which is to be found at both sides of the outlet opening 22 and of which the portion Vvsx remains with the overall portion Vpx until the next working cycle in the extrusion head 10, that is to say in the part of the communicating duct which is adjacent to the outlet opening 22, whereas the portion Vve is part of the overall portion Vp which forms the preform 43 and is already outside the extrusion head 10 and is thus separated from the extrusion head 10, with the preform and the article to be produced therefrom. In the next following working cycle when the overall portion Vpx is ejected through the outlet opening 22, the portion Vvsx of the portion Vv of disturbed laminate at the free end of the preform 43 is in the region of the end portion Vcx which remains outside the mold cavity 48 when the mold 47 is closed and forms the lower waste or flash portion 51 on the expanded article 57. Accordingly the portion Vvsx occupies the position of the portion Vvs in FIG. 8a.

Using simple means, the above-described procedure makes it possible for the disturbed portions Vve and Vvs each to be positioned in the respective end portions Vb and Vc of the preform Vp, which, when the blowing mold 47 is closed, are squeezed off the middle portion Va from which the article 57 is subsequently made. That ensures that the middle portion Va and therewith the finished article 57 do not have wall regions in which the laminate is of an irregular configuration or is disturbed in some fashion.

With the procedure described above with reference to FIGS. 8a and 8b, the respective disturbed portion Vv of laminate is divided in the plane 62 in such a way that its portions Vvs and Vve are positioned in two end portions Vb and Vc which have been squeezed off on two preforms produced in successive working cycles. That means that each of the waste portions 51 and 53 which are produced from the end portions Vc and Vb needs to accommodate only one portion Vvs and Vve respectively of disturbed laminate. It has been found in a practical situation that the length of the end portion Vc and Vb for forming the waste portions 51 and 53, which length is required in any case by virtue of the operating procedures involved, is generally sufficient to accommodate the sub-portions Vvs and Vve of the overall portion Vv of disturbed laminate. However it is perhaps also possible for the arrangement to be such that the entire disturbed portion Vv is disposed in only one of the two waste portions 51 or 53.

Figure 9:
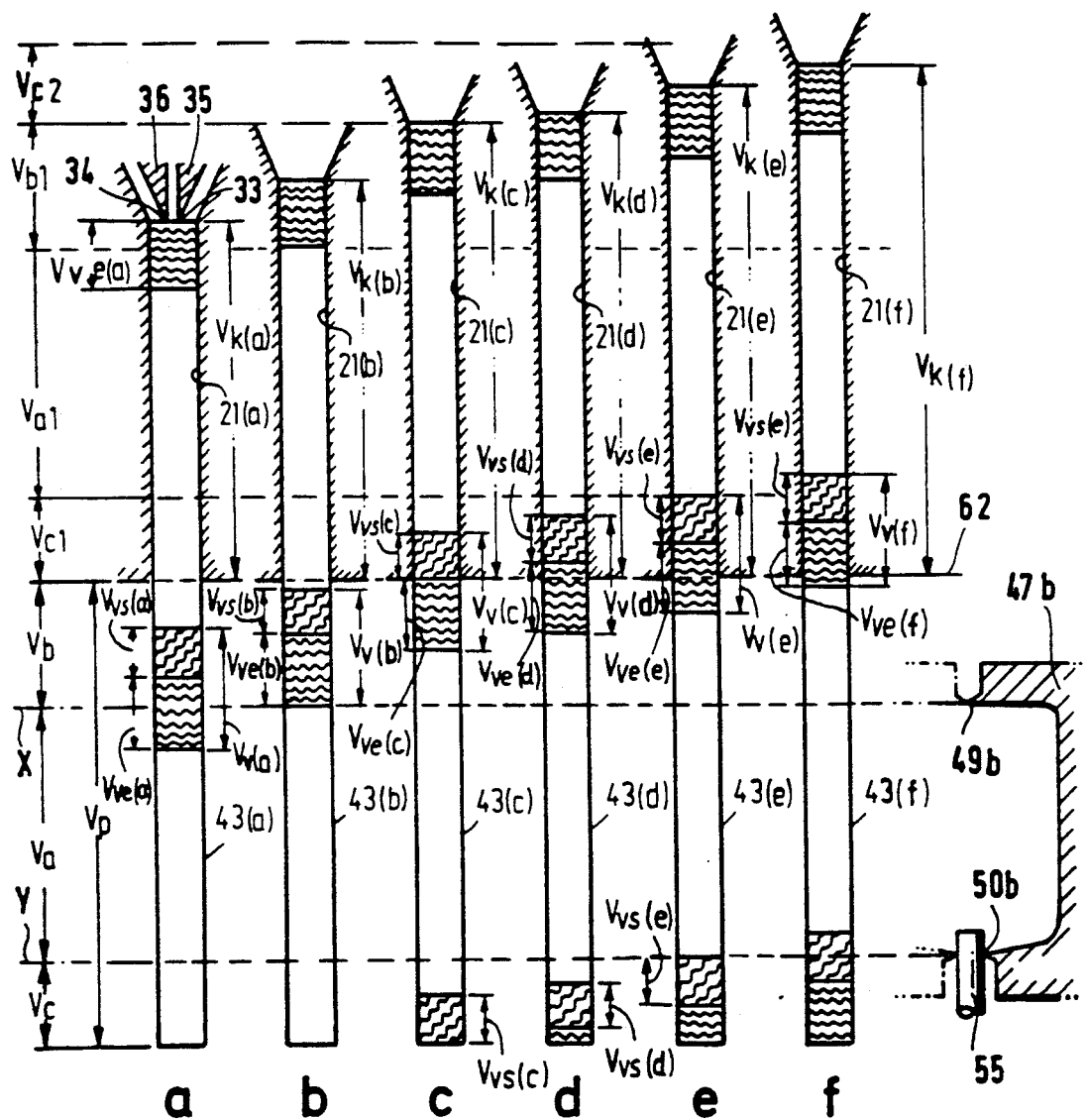
FIG. 9 is a representation in graph form of the positioning of the regions of disturbed laminate in the preform, in dependence on the volume of the communicating duct.

The conditions to be observed in regard to positioning of the disturbed portion Vv of material are described hereinafter with reference to FIG. 9. FIG. 9 is a greatly simplified representation of the region between the laminate-formation location beneath the edges 33 and 34, and the lower end of the preform which hangs down from the extrusion head 10, in six different embodiments as indicated at a through f in which the communicating ducts 21 are of different volumes as indicated at Vk, wherein the volume of the duct and the preform is respectively represented by the length thereof. In that connection embodiment c in FIG. 9 corresponds to the embodiment described above with reference to FIGS. 1 through 7, in that the volume Vk(c) of the communicating duct 21(c) is equal to the volume of the preform 43(c), that is to say the overall portion Vp of material which constitutes the preform. Consequently the disturbed sub-portions Vve(c) and Vvs(c) are so disposed in the preform 43(c) that the sub-portion Vvs(c) is in the end portion Vc from which the waste portion 51 is produced. The disturbed sub-portion Vve(c) is within the end portion Vb which constitutes the waste portion 53 between the mold cavity and the extrusion head 10. Accordingly, similarly to the embodiment shown in FIGS. 1 through 7, the plane 62 within which the outlet opening 22 of the extrusion head 10 is arranged extends between the sub-portion Vve(c) of disturbed material of the preform 43(c), and the sub-portion Vvs(c) of the overall portion of material for the next following preform, which is in the communicating duct 21. The half 47b of the blowing mold, which is shown in FIG. 9 beside the representations a through f, shows that, with that positioning of the regions of disturbed laminate, the planes x and y in which the end portions Vb and Vc are each separated from the middle portion Va from which the article 57 is subsequently produced, are at a spacing from the sub-portions Vvs(c) and Vve(c) of disturbed laminate which are in the two end portions Vb and Vc, so that even if some unforeseeable influences result in the sub-portions of disturbed laminate being of somewhat greater axial extent, they still remain within the end portions Vb and Vc which represent excess material and therefore waste.

In the embodiment indicated at b in FIG. 9, the volume Vk(b) of the communicating duct 21(b) is smaller than in the embodiment indicated at c. However the volume Vk(b) still satisfies the condition $Vk \geq Vp - Vb + Vve$ which defines the admissible minimum volume Vk of the communicating duct 21. Representation b in FIG. 9 shows that, under those conditions, the sub-portions Vvs(b) and Vve(b) which forms the entire portion Vv(b) of disturbed laminate, are positioned in an end portion of the preform 43(b), namely the end portion Vb which is responsible for providing the waste portion 53 which is disposed between the blowing mold cavity and the extrusion head. Positioning of the overall portion Vv(b) of disturbed laminate within the end portion Vb also shows that this is a limit condition as the limit between the overall portion Vv(b) or the sub-portion Vve(b) thereof on the one hand, and the middle portion Va from which the article is made, on the other hand, coincides with the plane x in which the squeeze-off edges 49a and 49b of the blowing mold 47 squeeze the end portion Vb off the middle portion Va, forming the waste or flash portion 53. The result of the communicating duct 21(b) being of smaller volume than the embodiment indicated at c in FIG. 9 is that a part of the laminate which is formed in the communicating duct during the emptying stroke movement of the pistons 29, 30 and 31, which movement is the same in all the embodiments a through f, is advanced beyond the plane 62 into the preform 43(b) which is formed in the same emptying stroke movement.

That is the case to an even greater degree in embodiment a in FIG. 9, as Vk(a) is smaller than the minimum volume Vp−Vb+Vve so that the above-indicated limit condition, in regard to the minimum volume of the communicating duct 21, is no longer fulfilled. That means that the portion Vv(a) of disturbed laminate extends with a part of its sub-portion Vve(a) into the portion Va from which the article is formed.

In the embodiment indicated at d in FIG. 9, the volume Vk(d) of the communicating duct 21 is greater than Vp but smaller than the admissible maximum volume Vp+Vc−Vvs. In this case the total portion Vv(d) of disturbed laminate is distributed to both end portions Vb and Vc, but in such a way that the end portion Vc has not only the sub-portion Vvs(d) of disturbed laminate, but also a part of the sub-portion Vve(d). Accordingly the end portion Vb accommodates only a part of the sub-portion Vve(d) of disturbed laminate so that the separating plane 62 passes through the sub-portion Vve(d). In this case also the arrangement is one in which the components of the portion Vv(d) of disturbed laminate are respectively positioned at a spacing from the planes x and y in the end portions Vb and Vc respectively. The result of the communicating duct as indicated at Vk(d) being larger than in the embodiment indicated at c is therefore that the laminate formed in the communicating duct during an emptying stroke movement does not totally fill the communicating duct. On the contrary, at the end of the emptying stroke movement, a short part of the overall portion formed in the preceding working circle remains in the communicating duct 21(d), with the plane 62 extending through the portion Vve(d) formed at the end of the preceding working cycle.

The communicating duct in the embodiment indicated at e in FIG. 9 is of even larger volume than the communicating duct Vk(d) as the volume Vk(e) is equal to Vp+Vc−Vvs. It therefore corresponds to the maximum admissible value in respect of Vk, with the result that the end portion Vc of the preform 43(e) entirely consists of disturbed laminate and the limit or boundary between that disturbed laminate in the end portion Vc and the middle portion Va from which the article is to be produced lies in the plane y in which the end portion Vc is squeezed off the middle portion Va by the edges 50a and 50b, thereby forming the flash or waste portion 51. Positioned in the end portion Vb of the preform 43(e) is only a part of the portion Vve(e) of disturbed laminate, which is at a spacing from the plane x which divides the middle portion Va from the end portion Vb.

The embodiment indicated at f in FIG. 9 shows that, when the admissible maximum volume Vp+Vc−Vvs for Vk(f) is exceeded, a part of the disturbed laminate projects beyond the lower end portion Vc into the middle portion Va.

The embodiments indicated at d to f in FIG. 9 show that, with increasing volume Vk in respect of the communicating duct 21, the proportion of the disturbed portion Vv which is to be found in the sub-portion Vc at the end of the preform remote from the outlet opening 22 increases. Embodiments a and b show that, with a decreasing volume Vk in respect of the communicating duct 21, the proportion of the disturbed portion Vv which is in the end portion Vb which is towards the outlet opening 22 increases. That applies in both cases as long as the position of the portion of disturbed laminate does not project beyond the plane y or x respectively, into the respectively associated middle portion Va.

When reference is made hereinbefore to the fact that, with Vk=Vp in the separating plane 62 defined by the outlet opening 22, the overall portion Vv of disturbed laminate is separated in such a way that the one portion Vve is a part of the preform 43 which is suspended from the extrusion head 10 while the other portion Vvs remains in the region of the communicating duct 21 which directly adjoins the outlet opening 22 and is thus a part of the overall portion Vpl or Vpx which is disposed in the communicating duct 21 until the next working cycle takes place, that involves a possibly somewhat idealised description of the situation as the thermoplastic nature of the material forming the individual portions for constituting the respective preforms means that certain variations in dimension of the material are inevitable, in particular in the region of the outlet opening 22, for example by virtue of a swelling action on the part of the plastic material, and such variations in dimension can provide that the relative position of the individual portions relative to the outlet opening 22 and therewith the separating plane 62 varies somewhat. It will be appreciated that a similar consideration also applies in regard to the position of the preform which is suspended from the extrusion head 10, relative to the blowing mold 47, and relative to the squeeze-off edges thereof. However under normal operating conditions those variations are so slight that they are practically insignificant. That also applies in regard to the position of the portions of disturbed laminate relative to the blowing mold 47, especially since, as can be seen in particular from the embodiments illustrated in FIG. 9, the end portions Vb and Vc from which the flash or waste portions 53 and 51 are produced are normally of a volume and therewith an axial extent which readily make it possible for the portions of disturbed laminate to be positioned in the end portions Vb and Vc respectively in such a way that they are at a spacing from the respectively adjacent plane x and y respectively; even in the event of a minor axial shift in the position of the preform relative to the blowing mold, that spacing ensures that the portions of disturbed laminate remain outside the middle portion Va from which the end product is to be produced.

Figure 10:
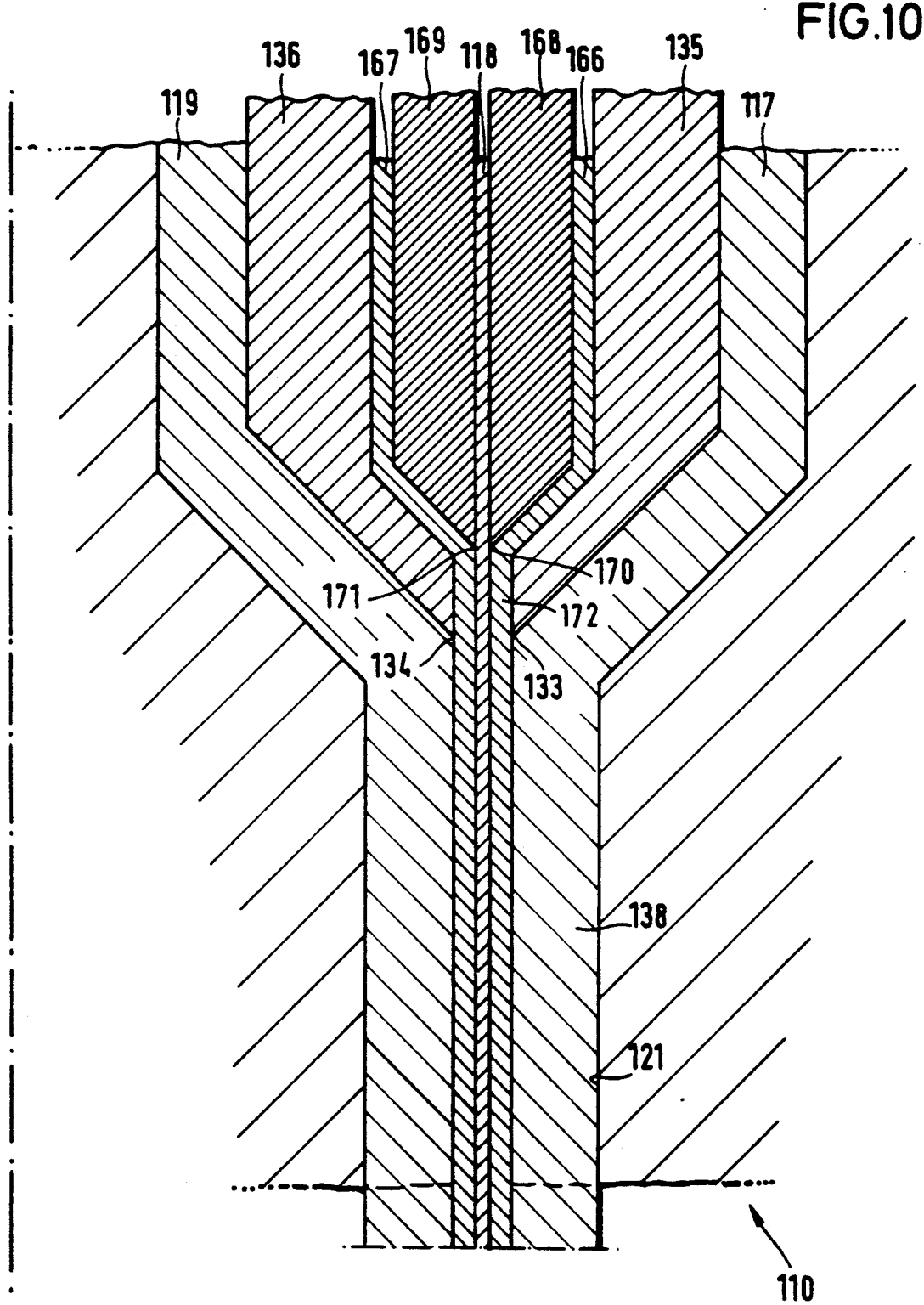
FIG. 10 is a view of part of a third embodiment of the apparatus according to the invention.

Reference will now be made to FIGS. 10 and 11 of the drawing showing a part of an extrusion head which is used to produce preforms with a wall structure made up of five layers. In FIGS. 10 and 11, parts which are identical to those of the embodiment described above with reference to FIGS. 1 through 7 are denoted by the same reference numerals, which however are increased by 100.

To correspond to the number of layers in the laminate 138 to be produced, the extrusion head 110 of the embodiment illustrated in FIGS. 10 and 11 is provided with five ducts 117, 166, 118, 167 and 119 which, similarly to the ducts of the embodiment described above with reference to FIGS. 1 through 7, are of an annular configuration and are arranged coaxially with respect to each other. The storage chambers which are associated with the respective ducts 117, 166, 118, 167 and 119 but which are not shown in FIGS. 10 and 11, with the pistons operatively associated therewith, are disposed above the region of the extrusion head 110 which is illustrated in FIGS. 10 and 11.

The ducts 117, 166, 118, 167 and 119 communicate with a communicating duct 121 through which the laminate 138 flows towards the outlet opening of the extrusion head 110. In the majority of cases, the outlet opening of the extrusion head 110 is at the bottom of the extrusion head. Corresponding to the existence of the five ducts, the extrusion head has four separating walls 135, 168, 169 and 136 which delimit the individual ducts. The lower ends of the two middle separating walls 168 and 169 which are formed by peripherally extending edges 170 and 171 are disposed in a common plane which extends perpendicularly to the longitudinal axis of the extrusion head, that is to say normally horizontally. The lower ends of the two outer walls 135 and 136 are also in the form of edges 133 and 134. They extend in a common plane which is parallel to the plane in which the edges 170 and 171 are disposed. However the edges 133 and 134 of the two outer walls 135 and 136 are displaced somewhat towards the outlet opening, relative to the edges 170 and 171 of the other walls 168 and 169, thus providing first and second laminate-formation regions in the extrusion head. In the first laminate-formation region, the flows of material which flow through the ducts 166, 118 and 167 are combined together to form an intermediate laminate as indicated at 172, after passing the edges 170 and 171. After passing the edges 133 and 134, the intermediate laminate 172 is combined with the flows of material issuing from the ducts 117 and 119 to form the final definitive laminate 138.

Referring now to FIG. 11, shown therein is an operating condition which corresponds to that illustrated in FIG. 7. As there are first and second laminate-formation locations, the portion Vvc of disturbed laminate extends through the intermediate laminate 172 and into the region of the five-layer laminate 138, which adjoins the edges 133 and 134 of the outer walls 135 and 136. The portion Vvc of disturbed laminate can also be positioned in the waste portions of the article to be produced, in the above-described manner. In this case also it is possible for the portion of disturbed laminate to be possibly subdivided in such a way that it passes in the above-described manner into the waste or flash portions of two articles which are produced in two successive working cycles.

In a modification of the arrangement illustrated in FIGS. 10 and 11, it is also possible for all boundary edges of the separating walls to be disposed in one plane. The arrangement used will essentially depend on the structural configuration of the head, the available space and the maximum length of the disturbed portion of material. In any case, the endeavour will be to make the portion of disturbed material so short that it can be accommodated in the waste or flash portions, without those flash or waste portions being longer than is required in any case for reasons related to the operating procedure involved.

It will be appreciated that the invention can also be applied to the production of articles having a wall consisting of a number of layers which is not three or five.

In the embodiment illustrated in FIGS. 1 through 7 which concerns the production of articles with a wall structure consisting of three layers, the apparatus has three extruders so that an extruder is associated with each layer in the laminate. In a corresponding fashion, the embodiment illustrated in FIGS. 10 and 11 has five extruders if each layer of the laminate comes from its own particular extruder. It is possible although not necessary for example to provide only one extruder for the two layers 139 and 141 on the one hand, and only one extruder for the two layers 174 and 175 on the other hand, the extruders therefore each supplying the material for two layers, if the two pairs of layers each consist of the same material. In a corresponding fashion it is also possible to use only one extruder for forming the two outer layers 39 and 41 of the laminate structure 38 in the embodiment illustrated in FIGS. 1 through 7, so that in that case the apparatus would require only two extruders.

As an extrusion unit is generally used not just for the production of a single kind of article, it is desirable for the extrusion head to be of such a design configuration that the communicating duct can be suitably matched and adapted to the volume of a preform which is required for a given kind of article. That can be done for example by the lower region of the extrusion head in which the communicating duct is disposed accommodating an annular piston which delimits the communicating duct and which is set in position in dependence on the respectively required volume of the communicating duct. It is also possible for the region of the extrusion head, which contains the communicating duct, to be subdivided in planes which extend normal to the longitudinal axis of the extrusion head, and for the length of the individual portions of the communicating duct which are defined in that way to be selected in dependence on the respectively required volume of the communicating duct. The duct volume may also be different in the respective interchangeable portions constituting the duct, in order to provide for the respectively required volume for the communicating duct.

The invention can also be applied to those processes and apparatuses in which an end portion of the preform which is put into its definitive configuration is firstly produced by an injection molding procedure, whereupon a preform which is in one piece with that preformed end portion is then extruded, and expanded in a blow molding mold, with the end portion which is remote from the end portion produced in the injection molding procedure being squeezed off in the usual manner when the blow molding mold is closed. In that case also, the batch-wise production of a multi-layer preform would result in the formation of disturbed regions of laminate, which are squeezed off using the teaching according to the invention, and thus remain in the waste or flash portion.

In the above-described embodiments the preform is ejected vertically downwardly from the extrusion head so that the free end of the preform which hangs down from the extrusion head is the lower end of the preform. In a modification of that procedure however it is also readily possible for the invention to be carried into effect in situations in which the preform is ejected in a different direction, for example upwardly or in a horizontal direction. Upward ejection is for example readily possible and is a known procedure if the end of the preform which is the leading end in the direction of movement thereof is guided. In such a situation, the guide elements may be mold portions in which for example the neck of a bottle to be produced from the preform is molded.

It will be appreciated that the above-described embodiments of the process and apparatus according to the present invention have been set forth solely by way of example and illustration thereof and that various modifications and alterations may be made therein without thereby departing from the spirit and scope of the invention.

What is claimed is:

1. A process for producing multilayer hollow bodies by blow molding of batch extruded preforms, each preform including a tubular wall with at least two layers of different thermoplastic materials laminated together, a substantially identical predetermined volume of laminate material being extruded into each preform, comprising the steps of:

accumulating in a plurality of separate storage chambers of a single extrusion head, the at least two different thermoplastic materials, each different thermoplastic material being accumulated in a separate storage chamber;

simultaneously ejecting from the plurality of separate storage chambers as separate, mutually adjacent flows one predetermined volume comprising each of the accumulated thermoplastic materials, the separate, mutually adjacent flows joining together in a laminate-formation region to form a laminate structure of the different thermoplastic materials, the laminate formation region occupying a stationary predetermined location in the extrusion head, the laminate structure of the material in the laminate formation region being disturbed over at least a portion of its length during at least one of a beginning and ending of the ejecting step, the laminated material passing from the laminate-formation region into a communicating duct connecting the laminate-formation region with an outlet opening from the extrusion head, the communicating duct having a volume between the laminate formation region and the outlet opening sufficient to receive and hold at least substantially all of at least the one predetermined volume of laminate material formed during the ejecting step;

extruding one predetermined volume of the laminate material from the communicating duct through the extrusion head outlet opening as one preform, the one extruded preform passing from the outlet opening into a mold cavity of a divided, blow molding mold, the one preform having first and second end portions and a central portion between the end portions, the first end portion preceding the central portion through the extrusion head outlet opening and the second end portion trailing the central portion through the extrusion head outlet opening; and expanding at least part of the central portion of the one preform within the mold cavity to form a hollow body while squeezing off at least the first and second end portions of the one preform outside the mold cavity as excess flashing, the volume of the communicating duct being selected such that the squeezed-off first and second end portions of the one preform contain at least essentially all of the disturbed laminate structure in the one predetermined volume of the laminate material forming the one preform.

2. The process as set forth in claim 1 wherein a sum of a volume of the laminate material constituting the first end portion and a volume of the laminate material constituting the second end portion of the one preform is at least as great as a sum of volumes of any portions of the laminate material of the one predetermined volume disturbed during any of the ejecting steps and wherein the volume of the communicating duct between the laminate-formation region and the outlet opening is:

(a) at least as great as a sum of a volume of the laminate material constituting the central portion of the one preform plus a volume of the laminate material constituting the first end portion of the one preform plus the volume of any portion of the laminate material in the one preform disturbed at the ending of one of the ejecting steps, and (b) only as great as a sum of the one predetermined volume plus a volume of the laminate material constituting the first end portion of one preform less the volume of any portion of the laminate material in the one preform disturbed at the beginning of one of the ejecting steps.

3. The process as set forth in claim 1 wherein the volume of the communicating duct equals the predetermined volume of one preform.

4. The process as set forth in claim 1 wherein the volume of the communicating duct between the laminate-formation region and the outlet opening is:

(a) at least as great as a sum of the predetermined volume plus a volume of the laminate material constituting the central portion of the one preform plus a volume of the laminate material constituting the first end portion of the one preform plus a volume of any portion of the laminate material of the one preform disturbed at the ending of one of the ejecting steps, and (b) only as great as a sum of twice the predetermined volume plus a volume of the laminate material constituting the first end portion of one preform less a volume of any portion of the laminate material of the one preform disturbed at the beginning of one of the ejecting steps.

5. The process as set forth in claim 1 wherein the volume of the communicating duct between the laminate-formation region and the outlet opening is equal to an integral multiple of the predetermined volume plus a volume:

(a) at least as great as a sum of a volume of the laminate material constituting the central portion of the one preform plus a volume of the laminate material constituting the first end portion of the one preform plus a volume of any portion of the laminate material of the one preform disturbed at the ending of any of the ejecting steps, and (b) only as great as a sum of the predetermined volume plus a volume of the laminate material constituting the first end portion of the one preform less a volume of any portion of the laminate material of the one preform disturbed at the beginning of any of the ejecting steps.

6. The process as set forth in claim 2 wherein each of the first and second end portions of the one preform includes laminate material having structure disturbed during at least one of the ejecting steps.

7. The process as set forth in claim 2 wherein only one of the first and second end portions of the one preform contains laminate material having structure disturbed during any of the ejecting steps.

8. The process as set forth in claim 2 wherein the volume of the communicating duct is variable and further comprising the step of setting the volume of the communicating duct to position the disturbed portions of the laminate material of each preform into only the squeezed-off first and second end portions of the preform.

9. The process as set forth in claim 1 wherein the accumulation step comprises the step of feeding the different thermoplastic materials simultaneously and continuously into the separate storage chambers between ejecting steps and during ejecting steps.

10. A batch process for producing multilayer hollow bodies from thermoplastic materials by blow molding of preforms, each preform being extruded in one working cycle through an outlet opening by an extrusion unit including a single extrusion head with the outlet opening and a plurality of extruders coupled with the single extrusion head, said extruders collectively containing different materials including at least two different thermoplastic materials, each preform including a tubular wall with layers of the different materials laminated together, the wall including at least one layer of each of the at least two different thermoplastic materials, a substantially identical predetermined volume of laminate material being extruded into each preform, the said each preform having first and second end portions and a central portion between the end portions from which central portion the entire hollow body is formed, the first end portion preceding the central portion through the extrusion head outlet opening and the second end portion trailing the central portion through the extrusion head outlet opening, comprising the steps of:

collectively accumulating in a plurality of separate storage chambers of the extrusion unit, the different materials including at least two different thermoplastic materials extruded by the plurality of extruders;

ejecting from the plurality of separate storage chambers simultaneous separate flows of the different materials including each of the at least two different thermoplastic materials and directing the separate flows to a laminate-formation region occupying a stationary, predetermined location in the single extrusion head, the separate flows joining together as mutually adjacent flows in the laminate formation region to form a laminate structure of the different thermoplastic materials, disturbances in said laminate structure occurring in said laminate formation region during the beginning and/or ending of the ejection step, the laminate-formation region being connected by a communicating duct with the outlet opening from the extrusion head, the communicating duct having a volume between the laminate formation region and the outlet opening sufficient to receive and hold at least one central portion of the laminate material passing into the communicating duct during the ejecting step for at least one working cycle;

extruding on predetermined volume of the laminate material, including said central portion, through the extrusion head outlet opening as one preform; and closing parts of a divided blow molding mold together on the one preform with at least part of the central portion of the one preform located within a mold cavity defined by the closed parts of the mold to form a hollow body and to squeeze off at least the first and second end portions of the one preform outside the mold cavity as flashing, the volume of the communicating duct being selected such that the squeezed-off first and/or second end portions of the one perform contain at least essentially all of the disturbed laminate structure in the one predetermined volume of the laminate material forming the preform.

11. The process as set forth in claim 10 wherein a sum of a volume of the laminate material constituting the first end portion and a volume of the laminate material constituting the second end portion of the one preform is at least as great as a sum of volumes of any portions of the laminate material of the one predetermined volume of laminate material disturbed during any of the ejecting steps and wherein the volume of the communicating duct between the laminate-formation region and the outlet opening is:
  (a) at least as great as a sum of a volume of the laminate material constituting the central portion of the one preform plus the volume of the laminate material constituting the first end portion of the one preform plus a volume of any portion of the laminate material in the one preform disturbed at the ending of one of the ejecting steps, and
  (b) not greater than a sum of the predetermined volume plus the volume of the laminate material constituting the first end portion of the one preform less a volume of any portion of the laminate material in the one preform disturbed at the beginning of one of the ejecting steps.

12. The process as set forth in claim 10 wherein the volume of the communicating duct equals the predetermined volume of one preform.

13. The process as set forth in claim 10 wherein the volume of the communicating duct between the laminate-formation region and the outlet opening is:
  (a) at least as great as a sum of the predetermined volume plus a volume of the laminate material constituting the central portion of the one preform plus a volume of the laminate material constituting the first end portion of the one preform plus a volume of any portion of the laminate material of the one preform disturbed at the ending of any of the ejecting steps, and
  (b) not greater than a sum of twice the predetermined volume plus a volume of the laminate material constituting the first end portion of one preform less a volume of any portion of the laminate material of the one preform disturbed at the beginning of any of the ejecting steps.

14. The process as set forth in claim 10 wherein the volume of the communicating duct between the laminate-formation region and the outlet opening is equal to an integral multiple of the predetermined volume plus a volume:
  (a) at least as great as a sum of a volume of the laminate material constitiuting the central portion of the one preform plus a volume of the laminate material constituting the first end portion of the one preform plus a volume of any portion of the laminate material of the one preform disturbed at the ending of any of the ejecting steps, and
  (b) not greater than a sum of the predetermined volume plus a volume of the laminate material constituting the first end portion of the one preform less a volume of any portion of the laminate material of the one preform disturbed at the beginning of any of the ejecting steps.

15. The process as set fourth in claim 10 wherein each of the first and second end portions of the one preform includes laminate material having structure disturbed during at least one of the ejected steps.

16. The process as set forth in claim 10 wherein only one of the first and second end portions of the one preform contains laminate material having structure disturbed during any of the ejecting steps.

17. The process as set forth in claim 10 wherein the volume of the communicating duct is variable and further comprising the additional step of setting the volume of the communicating duct to position the disturbed portions of the laminate material of the one preform into only the squeezed-off first and second end portions of the one preform.

18. The process as set forth in claim 10 wherein said separate flows of the different materials contain materials which are extruded from said plurality of extruders during each ejecting step.

19. A batch process for producing multilayer hollow bodies by blow molding of preforms, each preform including a tubular wall of laminate material comprising at least two layers of different thermoplastic materials, each preform being extruded in one working cycle of the process through a single outlet opening from a substantially identical predetermined volume of the laminate material, each preform having first and second end portions and a central portion between the end portions from which central portion the entire hollow body is formed, the first end portion preceding the central portion through said opening and the second end portion trailing the central portion through said opening, comprising the steps of:

accumulating at least a part of each component of the laminate material in at least one separate storage area;

ejecting the components from the separate storage areas as simultaneous separate flows;

directing the separate flows to a laminate-formation region, the separate flows joining together as mutually adjacent flows in the region to form a laminate structure of the components, at least some of the laminate structure being disturbed in the region during a beginning and/or ending of the ejecting step;

providing a zone in the flow path between the laminate formation region and the outlet opening to receive the laminate material during the ejecting step, the zone having a volume sufficient to receive and hold at least one central portion of the laminate material having an undisturbed laminate structure;

holding at least said central portion of the laminate material in the zone during at least one accumulating step;

extruding one predetermined volume of the laminate material including at least said central portion through the outlet opening as one preform during a subsequent ejecting step; and surrounding at least part of the central portion of the one preform with a blow mold cavity to form a hollow body while squeezing off at least the first and second end portions of the one preform outside the mold cavity as flashing, the first and/or second end portions containing essentially all of the disturbed laminate structure in the one predetermined volume of the laminate material forming the preform.

20. The process as set forth in claim 19 wherein a sum of a volume of the laminate material constituting the first end portion and a volume of the laminate material constituting the second end portion of each preform is at least as great as a sum of volumes of any portions of the laminate material of each predetermined volume which are disturbed during a beginning or ending of the ejecting step of any of the working cycles and wherein the volume of the zone between the laminate-formation region and the outlet opening is:

(a) at least as great as a sum of a volume of the laminate material constituting the central portion of each preform plus the volume of the laminate material constituting the first end portion of each preform plus a volume of any portion of the laminate material of each preform disturbed at the ending of one ejecting step, and (b) not greater than a sum of the one predetermined volume plus the volume of the laminate material constituting the first end portion of each preform less a volume of any portion of the laminate material of each preform disturbed at the beginning of one ejecting step.

21. The process as set forth in claim 19 wherein the volume of the zone between the laminate-formation region and the outlet opening is:

(a) at least as great as a sum of the predetermined volume plus a volume of the laminate material constituting the central portion of each preform plus a volume of the laminate material constituting the first end portion of each preform plus a volume of any portion of the laminate material of each preform disturbed at the ending of one ejecting step, and (b) not greater than a sum of twice the predetermined volume plus the volume of the laminate material constituting the first end portion of each preform less a volume of any portion of the laminate material of each preform disturbed at the beginning of one ejecting step.

22. The process as set forth in claim 19 wherein the volume of the zone between the laminate-formation region and the outlet opening is equal to an integral multiple of the predetermined volume plus a volume:

(a) at least as great as a sum of a volume of the laminate material constituting the central portion of each preform plus a volume of the laminate material constituting the first end portion of each preform plus a volume of any portion of the laminate material of each preform disturbed at the ending of one ejecting step, and (b) not greater than a sum of the predetermined volume plus the volume of the laminate material constituting the first end portion of each preform less a volume of any portion of the laminate material of each preform disturbed at the beginning of one ejecting step.

23. The process as set forth in claim 19 wherein the volume of the zone is variable and further comprising the additional step of setting the volume of the zone to position the disturbed portions of the laminate material of the one preform into only the squeezed-off first and second end portions of the one preform.

24. The process as set forth in claim 19 wherein said separate flows of the different materials contain materials which are extruded from a plurality of extruders during each ejecting step.

25. The process as set forth in claim 19 wherein the volume of the zone equals the predetermined volume of one preform.

26. The process as set forth in claim 19 wherein each of the first and second end portions of the one preform incudes laminate material having structure disturbed during at least one of the ejecting steps.

27. The process as set forth in claim 19 wherein only one of the first and second end portions of the one preform contains laminate material having structure disturbed during any of the ejecting steps.

* * * * *